(12) United States Patent
Tabata et al.

(10) Patent No.: US 6,375,335 B1
(45) Date of Patent: *Apr. 23, 2002

(54) ILLUMINATION DEVICE AND INFORMATION PROCESSING APPARATUS

(75) Inventors: Masami Tabata, Isehara; Tatsundo Kawai, Hadano, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,516

(22) Filed: Dec. 16, 1997

(30) Foreign Application Priority Data

| Dec. 19, 1996 | (JP) | ............................................. 8-350336 |
| Dec. 19, 1996 | (JP) | ............................................. 8-350337 |
| May 28, 1997 | (JP) | ............................................. 9-138478 |

(51) Int. Cl.$^7$ ................................................ F21V 8/00
(52) U.S. Cl. ........................... 362/31; 362/555; 362/26
(58) Field of Search ........................... 362/31, 26, 555, 362/558

(56) References Cited

U.S. PATENT DOCUMENTS

| 5,142,456 | A | * | 8/1992 | Murphy ........................ 362/26 |
| 5,390,085 | A | * | 2/1995 | Mari-Roca et al. ............ 362/31 |
| 5,410,454 | A | * | 4/1995 | Murase et al. ............. 362/26 X |
| 5,485,291 | A | * | 1/1996 | Qiao et al. ................. 362/26 X |
| 5,499,112 | A | | 3/1996 | Kawai et al. ................ 358/475 |
| 5,581,683 | A | * | 12/1996 | Bertignoll et al. ....... 362/558 X |
| 5,779,339 | A | * | 7/1998 | Konishi et al. ........... 362/26 X |
| 5,808,708 | A | * | 9/1998 | Oyama et al. ............. 362/31 X |
| 5,810,463 | A | * | 9/1998 | Kawahara et al. ............ 362/31 |
| 5,839,812 | A | * | 11/1998 | Ge et al. ...................... 362/31 |
| 5,886,759 | A | * | 3/1999 | Mashino et al. .......... 362/26 X |

* cited by examiner

*Primary Examiner*—Laura K. Tso
(74) *Attorney, Agent, or Firm*—Robin, Blecker & Daley

(57) ABSTRACT

A light source or LED element is positioned adjacent to an entrance surface of a light guide element of stick shape made of a light transmissive substrate. The light that has entered from the entrance surface to the interior of the light guide element is scattered by a diffusion area to emerge from an exit surface in a predetermined direction, wherein the light that has entered from the entrance surface into the light guide element is not made incident directly on at least a part of the diffusion area.

66 Claims, 32 Drawing Sheets

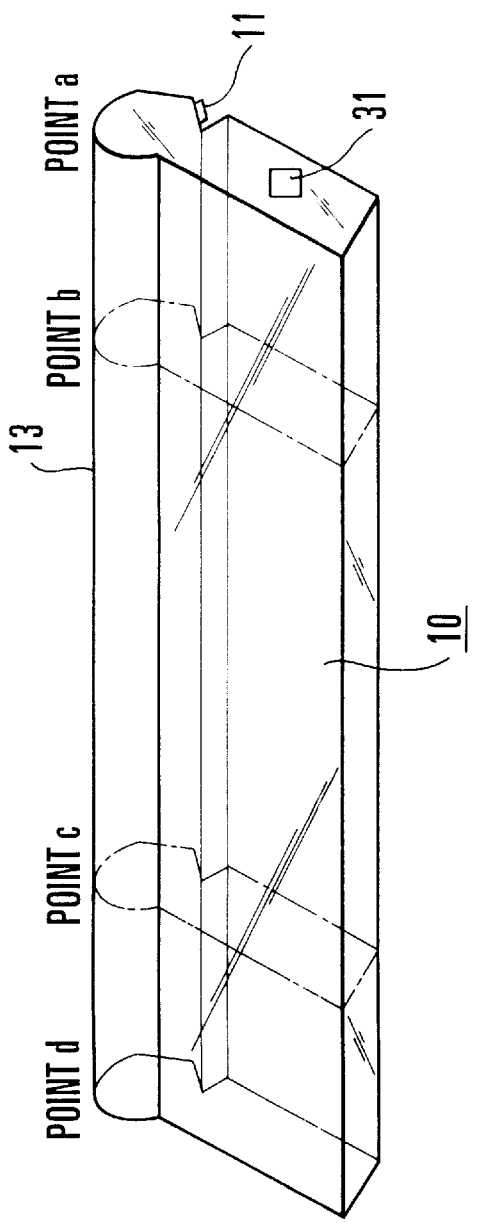
F I G. 29
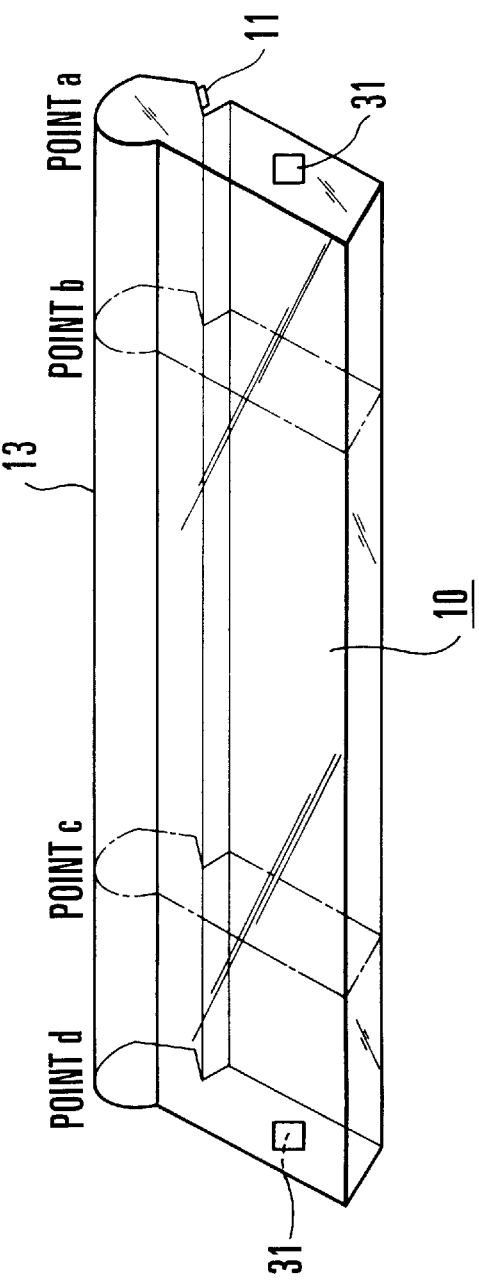
F I G. 30

POINT a, POINT d

POINT b, POINT c

F I G. 45 (PRIOR ART)
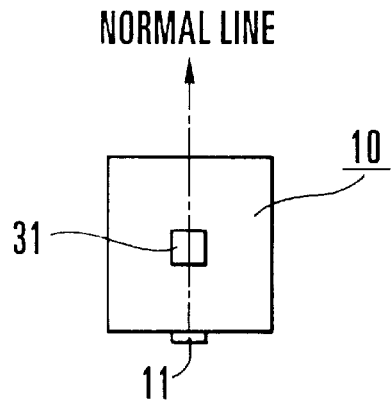
F I G. 46(a) (PRIOR ART)
F I G. 46(b) (PRIOR ART)
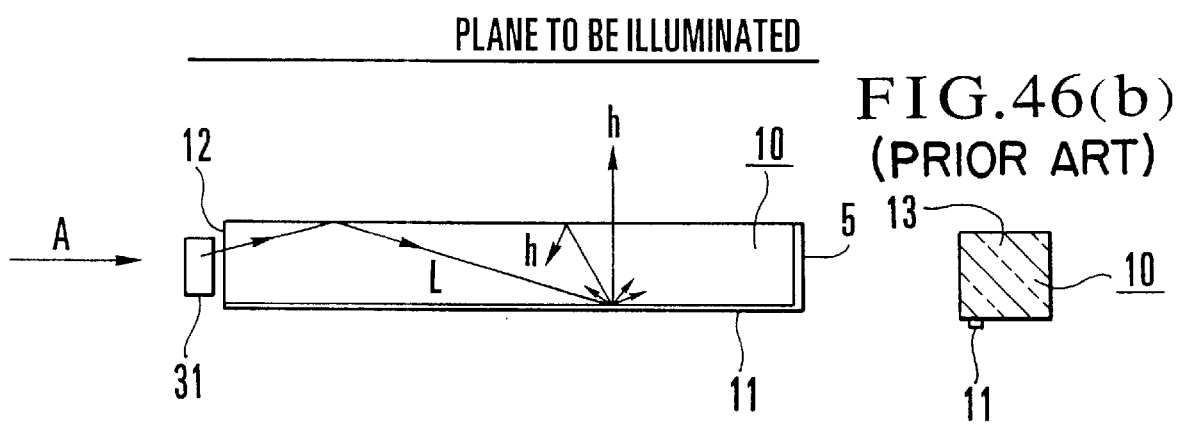
F I G. 46(c) (PRIOR ART)
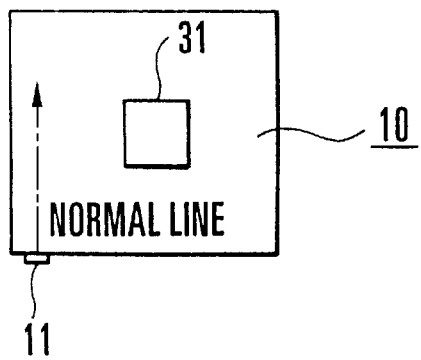

ILLUMINATION DEVICE AND INFORMATION PROCESSING APPARATUS

BACKGROUND OF THE INVENTION

1. Field of the Invention

The present invention relates to an illumination device using a light guide element and to an information processing apparatus provided with the illumination device.

2. Description of Related Art

The facsimile telegraphs, electronic photo copiers and other information processing apparatus are equipped with a reader for documents. The reader is associated with the illumination device in the form of a discharge tube such as fluorescent tube or an linear array of a great number of LED (light emitting element) chips.

In recent years, the facsimile telegraph and personal computer have widely spread. A peripheral device therefor, namely scanner, is coming into general home use. Along with this comes a growing demand for products of smaller size and lower price. To meet such a demand, the LED chip is favorable as the light source. To reduce the number of LED chips there have been previous proposals for making use of a light guide element in the form of a stick.

FIGS. 44 and 45 are respectively a perspective view and a side elevation view of the stick-shaped illumination device using the light guide element. An LED element 31 is used in combination with a light guide element 10 made from a light-transmissive substrate in the form of a quadrangular pole. Light from the LED element 31 enters the light guide element 10 at an entrance surface 12 thereof. As the substrate is propagating the light in the light guide element 10, a diffusion area 11 reflects or scatters the light to the outside of the light guide element 10. The diffusion area 11 is formed in a portion of the substrate by roughening one of its side surfaces or applying a light reflection coating thereto.

The LED element 31 is positioned adjacent the light guide element 10 so that all the entering rays from the entrance surface 12 to the inside of the light guide element 10 satisfy the condition of total reflection. Therefore, they undergo repeated inter-reflections between the side walls of the light guide element 10, thus propagating in its interior.

As the cycle of reflection is repeated, the rays eventually fall on the diffusion area 11, where they are reflected or scattered. All or some of the rays go to an exit surface 13 opposite to the diffusion area 11 and therefrom emerge to the outside, thus illuminating a desired position.

FIGS. 46(a), 46(b) and 46(c) show another LED illumination device using the stick-shaped light guide element disclosed in, for example, Japanese Laid-Open Patent Application No. Hei 6-217084.

The illumination device is shown in the side elevation view of FIG. 46(a) together with a manuscript on the position to be illuminated. FIG. 46(b) is a cross sectional view taken in a perpendicular plane of FIG. 46(a) to the paper. FIG. 46(c) is an end view as looked from the direction of arrow A of the illumination device.

To make uniform the strength of illuminance throughout the entire longitudinal length, provision is made in bringing the center of the LED element 31 out of coincidence with the normal line at the center of the short dimension or width of the diffusion area 11 as shown in FIG. 46(c).

The light reaching the diffusion area 11 directly from the light source, or the direct light, is thus reduced in the intensity. In turn, the proportion of the indirect light that at least once reflects from the other inner surfaces of the light guide element 10 than the diffusion area 11 is so much increased. Such an arrangement can propagate the entering light even farther away from the light source, producing an advantage of improving the longitudinal unevenness of illuminance over the fact that the illuminance is too high near the light source and becomes rapidly lower as the distance increases.

As far as the arrangement described above is concerned, for the near zone of the diffusion area to the light source, it is, however, in the prior art that the direct light is not yet much reduced in intensity to attain a desired uniformity of illuminance throughout the longitudinal length. Therefore, the application of such an illumination device is limited to low classes of products. When in application to the high class, an expensive correction circuit has to be used, because the electrical signals are obtained from a more uneven illuminance distribution than is required.

Another problem arises from the fact that, as mentioned before, ever increasing numbers of items of that information processing apparatus which necessitates the illumination device are spreading into general home use. So, an even more reduction of its size becomes inevitable. This trend is reflected to a demand for a further reduction of the size of the illumination device, too. If the light guide element of the illumination device is reduced in the cross sectional area according to such a demand, the unevenness of illuminance distribution worsens so much as not to be fit for actual use.

In more detail, the smaller the cross section of the light guide element is made in a similar figure, the shorter the distance from the LED element to a position at which the entering ray is for the first time incident on the inner wall at the equivalent angle becomes in proportion. So, the distance the light propagates to reach the diffusion area becomes extremely shorter, causing the illuminance to rise in the near zone to the LED element and become progressively lower toward the farther zones. Therefore, a problem arises in that the problem of the unevenness of illuminance becomes even more difficult to solve.

BRIEF SUMMARY OF THE INVENTION

An object of the invention is to provide an illumination device which is amenable to the easy technique of minimizing the size and has a higher uniformity of illuminance distribution, and an information processing apparatus using the same.

As applied to the type of illumination device in which the LED light source is used in combination with the light guide element, another object of the invention is to improve the compact form of the illumination device.

In the illumination device of the type described above, when the lateral size is reduced, the difference in illuminance between the near zone to the LED light source and the farthest zone therefrom increases largely. It is, therefore, another object of the invention to solve such a problem of the unevenness of illuminance.

To achieve the above objects, in accordance with an aspect of the invention, there is provided an illumination device which comprises a light source and a light-transmissive light guide element having an entrance surface at which light from the light source enters the light guide element, a diffusion area which diffuses the light coming from the entrance surface and an exit surface at which the diffused light exits in a predetermined direction, wherein the light guide element is formed such that the entering light coming from the entrance surface of the light guide element is not made incident directly on at least a part of the diffusion area of the light guide element.

In accordance with another aspect of the invention, there is provided an illumination device which comprises a light source and a light-transmissive light guide element having an entrance surface at which light from the light source enters the light guide element, a diffusion area which diffuses the light coming from the entrance surface and an exit surface at which the diffused light exits in a predetermined direction, wherein a part of the light guide element is narrowed.

By using such a construction and arrangement of the constituent parts, it is made possible to reduce the size sufficiently, while still permitting a uniformity of illumination to be achieved at a high strength, and to provide an illumination device of low cost.

It is made also possible to condense the projected light beam to a desired width, while keeping the uniform illumination, and, therefore, to provide illumination devices of wide versatility.

In accordance with a further aspect of the invention, there is provided an information processing apparatus equipped with an illumination device which comprises a light source and a light-transmissive light guide element having an entrance surface at which light from the light source enters the light guide element, a diffusion area which diffuses the light coming from the entrance surface and an exit surface at which the diffused light exits in a predetermined direction, wherein the light guide element is formed such that the entering light coming from the entrance surface of the light guide element is not made incident directly on at least a part of the diffusion area of the light guide element.

In accordance with a still further aspect of the invention, there is provided an information processing apparatus equipped with an illumination device which comprises a light source and a light-transmissive light guide element having an entrance surface at which light from the light source enters the light guide element, a diffusion area which diffuses the light coming from the entrance surface and an exit surface at which the diffused light exits in a predetermined direction, wherein a part of the light guide element is narrowed.

In addition, according to the invention, it is possible to provide an information processing apparatus capable of reading images with high accuracy and reliability.

These and other objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 29 is a perspective view of the illumination device shown in FIGS. 28(a) to 28(d).

FIG. 30 is a perspective view showing the configuration of a twentieth embodiment of the invention.

FIG. 45 is a side elevation view of the illumination device shown in FIG. 44.

FIGS. 46(*a*), 46(*b*) and 46(*c*) are schematic diagrams of the construction of the illumination device with the LED light source on the stick-shaped light guide element.

DETAILED DESCRIPTION OF THE INVENTION

Hereinafter, preferred embodiments of the invention will be described in detail with reference to the drawings.

Figure 1:
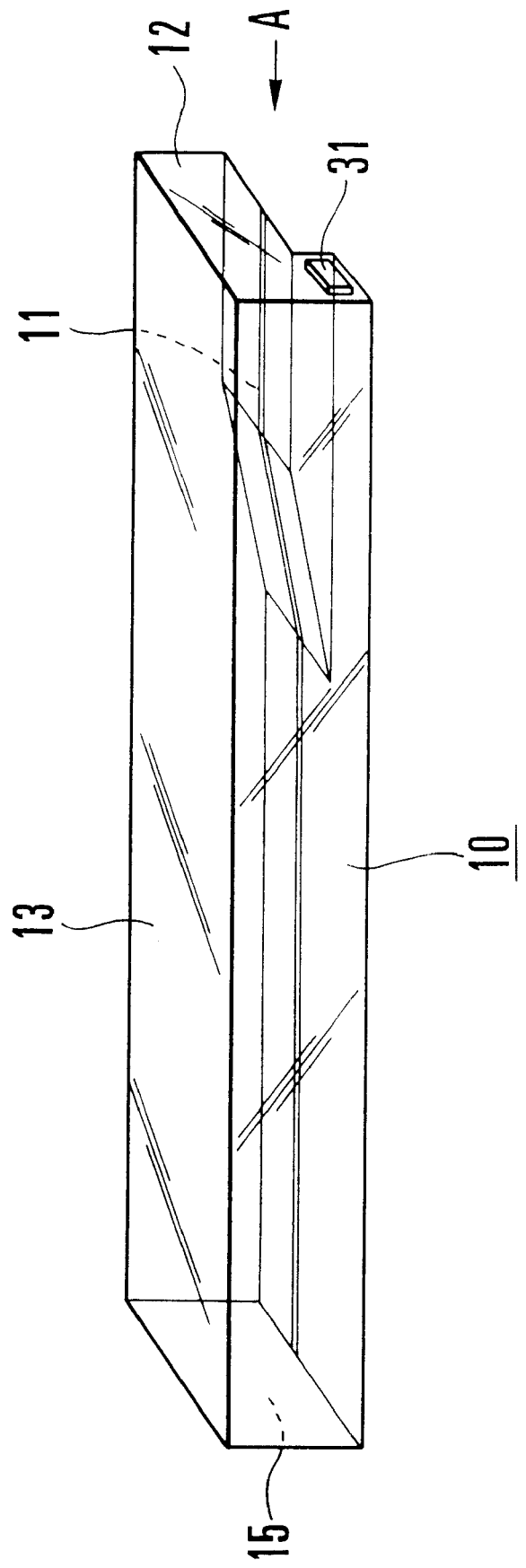
FIG. 1 is a perspective view showing the configuration of a first embodiment of the invention.
Figure 2:
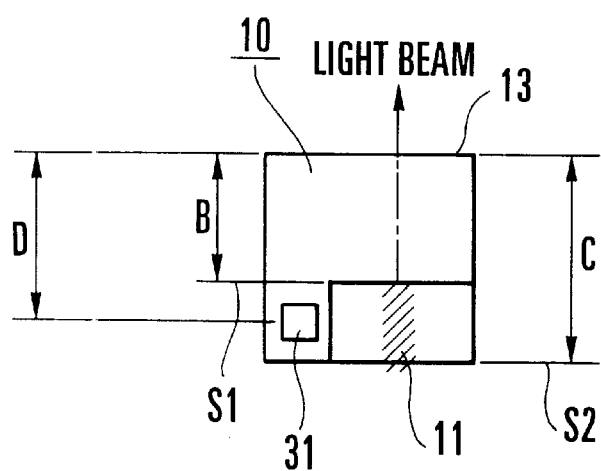
FIG. 2 is a side elevation view of the illumination device shown in FIG. 1.

FIG. 1 in perspective view shows an illumination device according to a first embodiment of the invention. FIG. 2 is its side elevation view as seen from the direction of arrow A.

As shown in FIGS. 1 and 2, the illumination device of the first embodiment comprises a light guide element 10 whose substrate is transmissive of light and formed to a special shape in cross-section and a light source or LED element 31 on one end surface in the longitudinal direction of the light guide element 10. A diffusion area 11 is arranged on the opposite surface to an exit surface 13 of the light guide element 10 to reflect or scatter the light. This diffusion area 11 can be formed by roughening a portion of that opposite surface or by applying a reflection coating thereto.

The light guide element 10 propagates the light from the LED element 31 toward the opposite end. In order to fold back the path of propagation by reflection, the terminal end of the light guide element 10 itself is provided with a return surface 15 formed either by evaporating metal such as aluminum, or by applying a metallic glossy coating or a light diffuse reflection coating.

The light from the LED element 31 undergoes total reflection from the inner walls of the light guide element 10, usually repeating the inter-reflection as it propagates in its interior. Upon arriving at the return surface 15, the light now reverses the direction, coming back to the LED element 31.

At a time during such propagation, the light hits the diffusion area 11, and is split by diffuse reflection off a portion which goes to a predetermined direction. This portion of light emerges from the exit surface 13 and is cast to the manuscript on the plane to be illuminated. The other portion of light undergoes again inter-reflection, proceeding with the propagation within the light guide element 10.

In the first embodiment, as shown in FIG. 2, for the near zone of the light guide element 10 to the entrance surface 12, the diffusion area 11 is formed on a plane S1. For the terminal zone which is near to the return surface 15, the diffusion area 11 is formed on another plane S2. Using these parameters, a rule of design for the light guide element 10 is set forth that the distance B from the plane S1 to the exit surface 13 is shorter than the distance C from the plane S2 to the exit surface 13. Another rule of design is that, as the LED element 31 is positioned adjacent to the entrance surface 12, the distance D from the center of area of the LED element 31 to the exit surface 13 is longer than the distance B but shorter than the distance C.

By such features, the zone near the entrance surface 12 is deprived of that part of the entering light which would otherwise reach the diffusion area 11 directly from the LED element 31. The indirect light that has at least once reflected from the other inner walls of the light guide element 10 than the diffusion area 11 only is allowed to hit the diffusion area 11. Therefore, the longitudinal unevenness of illuminance due to too much high an increase only at one side near to the LED element 31 or in the near zone to the entrance surface 12 is diminished sufficiently.

The light guide element 10 brings that part of the light which would otherwise directly fall on the diffusion area 11 in the near zone to the entrance surface 12 to the farther zone from the LED element 31. Therefore, the position to be illuminated is lighted up at a uniform intensity, as the illuminance is made uniform over the entire longitudinal length of the light guide element 10.

Figure 3A:
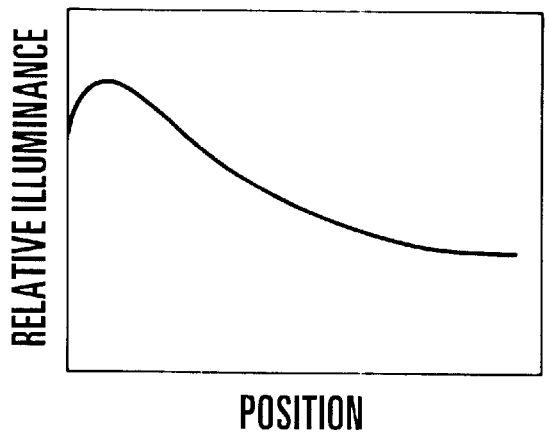
FIGS. 3(a) and 3(b) are graphs of the illuminance distribution of the illumination device.
Figure 3B:
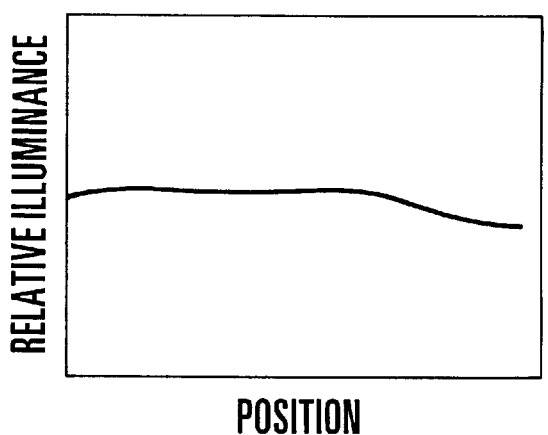

FIGS. 3(*a*) and 3(*b*) show the intensity distributions in the illumination devices. In the conventional illumination device, when the cross-sectional area of the light guide element is reduced, the longitudinal illuminance distribution of FIG. 3(*a*) results. In the illumination device of the first embodiment, on the other hand, when it is similarly reduced, the longitudinal illuminance distribution of FIG. 3(*b*) results. As is understandable from the graphs, the illumination device of the first embodiment, even when reduced in size, maintains almost flat the illuminance distribution.

Figure 4:
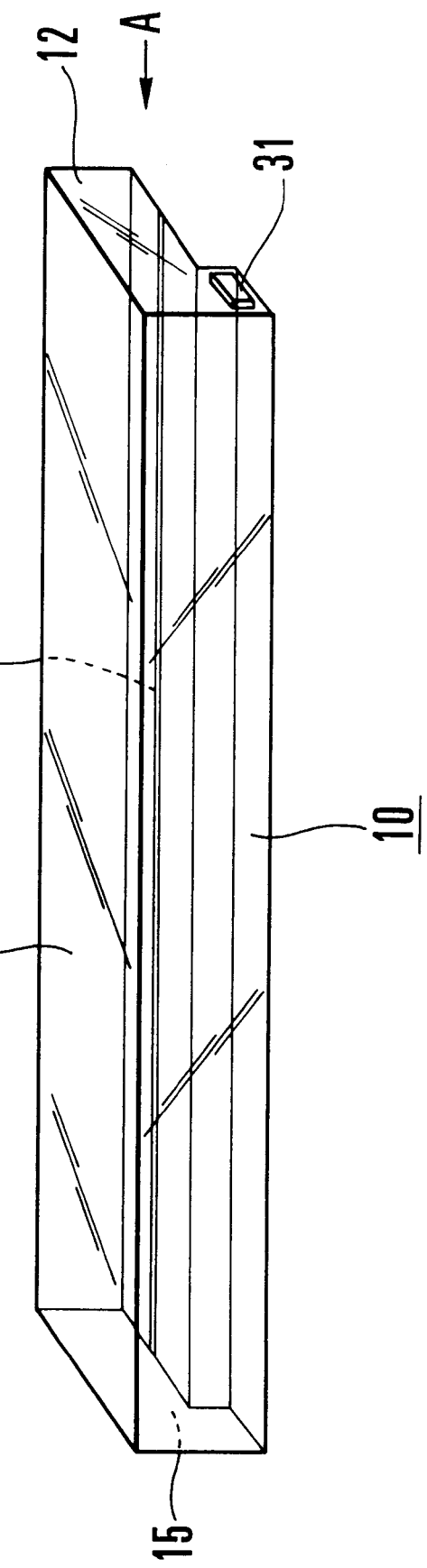
FIG. 4 is a perspective view showing the configuration of a second embodiment of the invention.
Figure 5:
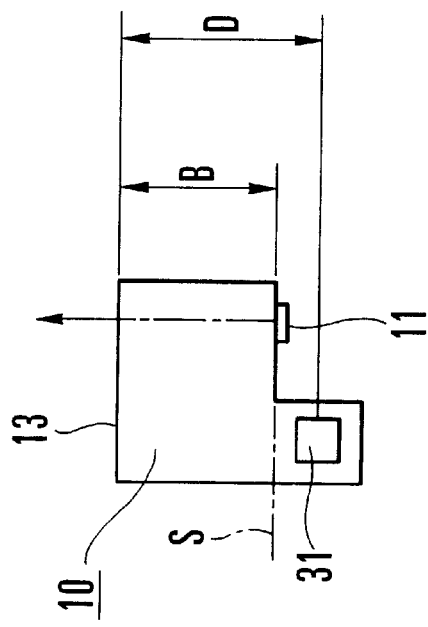
FIGS. 5 is a side elevation view of the illumination device shown in FIG. 4.

FIG. 4 is a perspective view showing the construction of an illumination device according to a second embodiment of the invention. FIG. 5 is its side elevation view as looked from the direction of arrow A.

In the second embodiment, the diffusion area 11 is formed on a common plane S over the total length of the light guide element 10. A rule of design is set forth that the distance D from the center of area of the LED element 31 to the exit surface 13 is longer than the distance B from the plane S to the exit surface 13. Under this condition, the light from the LED element 31 does not directly hit the diffusion area 11 over the entire length thereof. Therefore, the light guide element 10 can convey the light from the LED element 31 to a farther distance in the longitudinal direction.

Figure 6B:
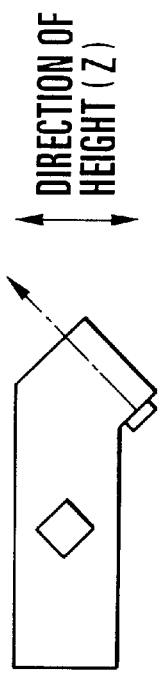
FIGS. 6(a) and 6(b) are side elevation views showing the configuration of a third embodiment of the invention.

FIGS. 6(*a*) and 6(*b*) are side elevation views showing the construction of a third embodiment of the invention. The turning of FIG. 6(*a*) through 45° clockwise in its own plane gives FIG. 6(*b*). FIG. 7 shows its schematic perspective.

The ways to use the illumination device are classified to two main groups, one of which is to hold it in the upright position so that the light is cast to the manuscript to be read in a perpendicular direction thereto. The other group is to tilt the axis of the illuminating light beam to a certain angle. The latter way is chiefly chosen in the general case.

For the illumination device adapted to be used in the latter way, the demand for reduction of the size is realized by the timing of its height.

In response to this demand, especially that for thinning, the third embodiment makes it possible to hold the illumination device as tilted to cast light to the manuscript at 45°.

Figure 6A:
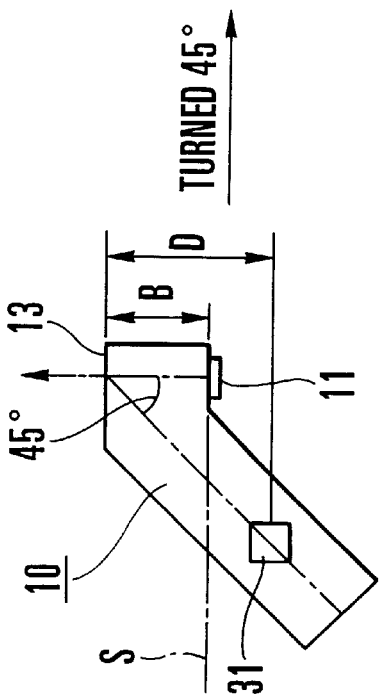
Figure 7:
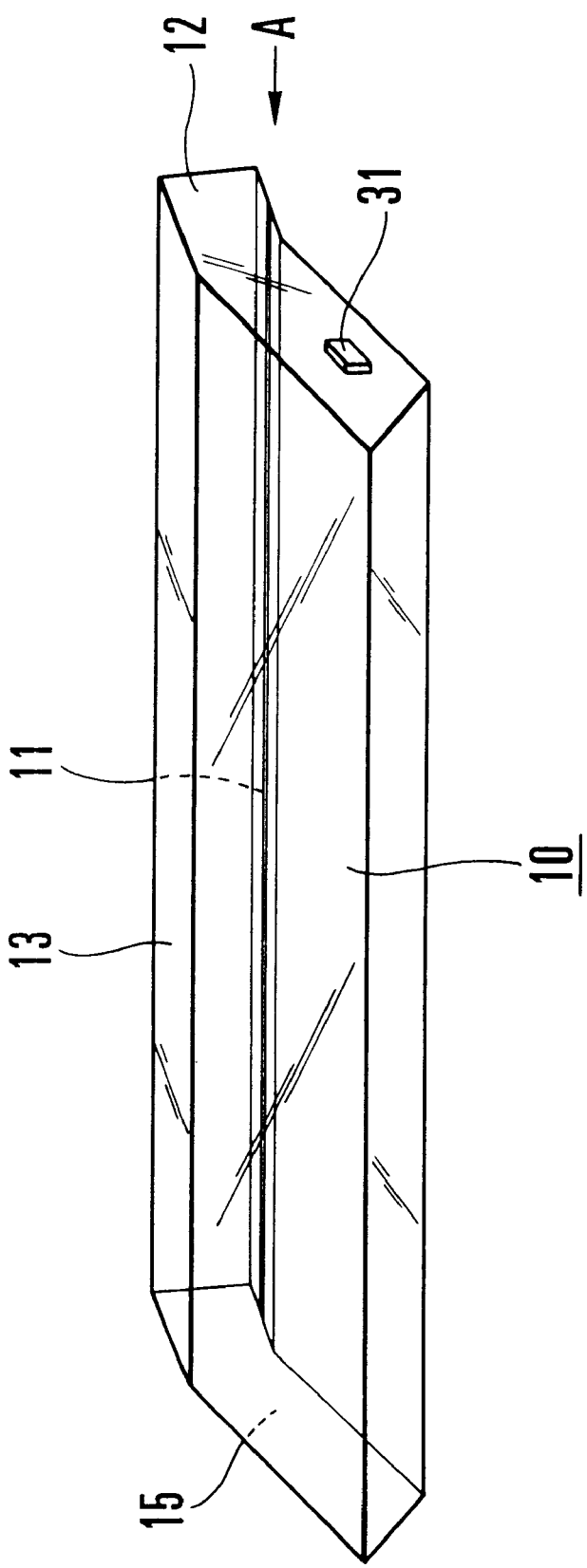
FIG. 7 is a perspective view showing the configuration of the illumination device shown in FIGS. 6(a) and 6(b).

In other words, as shown in FIG. 6(a), a line is drawn from the diffusion area 11 perpendicularly to the position to be illuminated. At 45° with respect to this normal line of the diffusion area 11, the light guide element 10 is elongated farther away from the position to be illuminated. The LED element 31 is disposed there.

Even in the third embodiment, a rule of design is set forth that the distance D from the center of area of the LED element 31 to the exit surface 13 is longer than the distance B from a plane S on which the diffusion area 11 is formed to the exit surface 13. Accordingly, the light from the LED element 31 does not directly hit the diffusion area 11.

Such a light guide element 10 shown in FIG. 6(a) is set up in a housing in the 45° turned position of FIG. 6(b). It is understandable that the thinning is realized in the direction of height.

It should be noted that the aforesaid angle is not limited to 45° and, needless to say, can take any value in the case of casting the light obliquely.

Figure 8A:
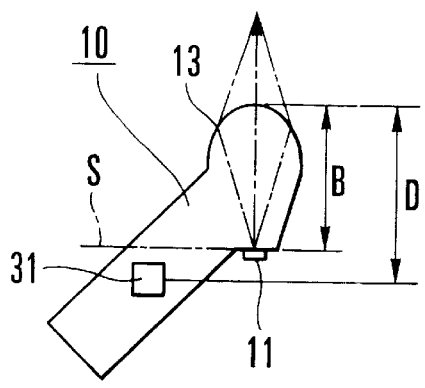
FIGS. 8(a) and 8(b) are respectively a side elevation view and a geometry of construction showing the configuration of a fourth embodiment of the invention.
Figure 8B:
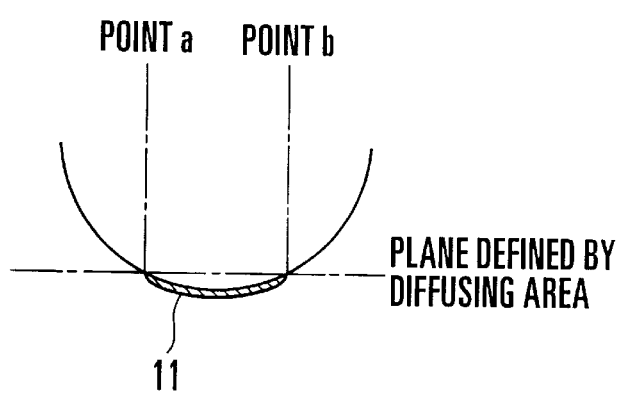

FIGS. 8(a) and 8(b) show a fourth embodiment of the invention, with FIG. 8(a) being a side elevation view and FIG. 8(b) being a fragmentary section view in enlarged scale of the diffusion area.

In the fourth embodiment, the exit surface 13 is formed to a lens shape, making it possible to increase the intensity of light on the position to be illuminated over the entire longitudinal length of the light guide element 10.

The diffusion area 11 is not necessarily flat across the width. This may be formed on a curved plane of the light guide element 10. If so, then a virtual flat plane containing both side lines of the diffusion area 11 indicated at points "a" and "b" in FIG. 8(b) is taken as the plane S. The LED element 31 is positioned with its center of area on the far side of the plane S from the exit surface 13.

Incidentally, to change the width to which the cast light beam is condensed, one method is by changing the lens shape. It should be noted in this connection that the light rays that must repeat the cycle of inter-reflection a certain number of times are also caused to change their angles of incidence on the inner walls. In some cases, the probability of impinging on the diffusion area 11 becomes so high that the illuminance distribution over the longitudinal length deviates from the optimum. So, there is need to take precaution for doing it.

Figure 9:
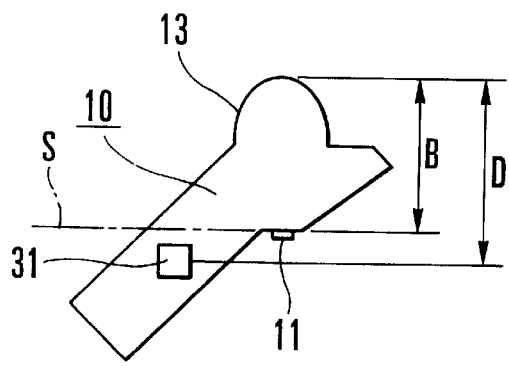
FIG. 9 is a side elevation view showing the configuration of a fifth embodiment of the invention.

FIG. 9 is a side elevation view of a fifth embodiment of the invention.

The fifth embodiment is to elongate that half of the light guide element 10 which is on the opposite side of the plane S of the diffusion area 11 to that with the LED element 31 as far as the space permits. Accordingly, it becomes possible to propagate the light to even more remote a distance.

Figure 10:
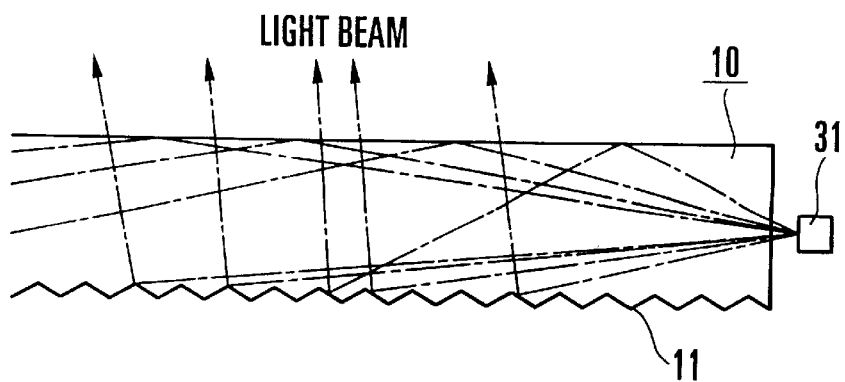
FIG. 10 is a geometry of construction showing the configuration of a sixth embodiment of the invention.

FIG. 10 is a fragmentary sectional view of a sixth embodiment of the invention with the diffusion area 11 shown in enlarged scale.

To form the diffusion area 11, instead of roughening a portion of the light guide element 10, or applying a diffuse reflection coating thereto so that it casts the diffuse reflection to the position to be illuminated, it is preferable to use another production technique that machines that portion to a saw teeth shape as shown in FIG. 10 and then coats it with a metal layer by evaporation or with a metallic glossy layer so that the specular reflection is cast to the position to be illuminated, thus improving the efficiency of illumination.

Also, the saw teeth-shaped portion for the diffusion area 11 may be left not coated with the metal layer or metallic glossy layer, relying only on the total reflection due to the difference in refractive index at the boundary between the light guide element 10 and the air.

Figure 11A:
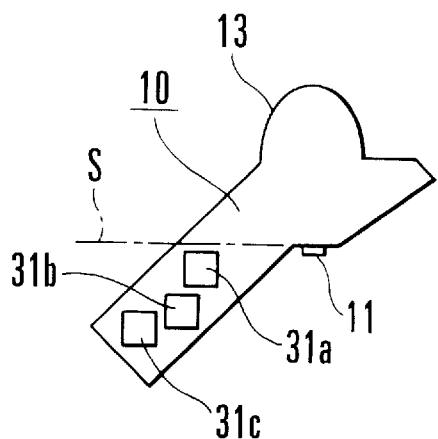
FIGS. 11(a) and 11(b) are side elevation views showing the configuration of a seventh embodiment of the invention.
Figure 11B:
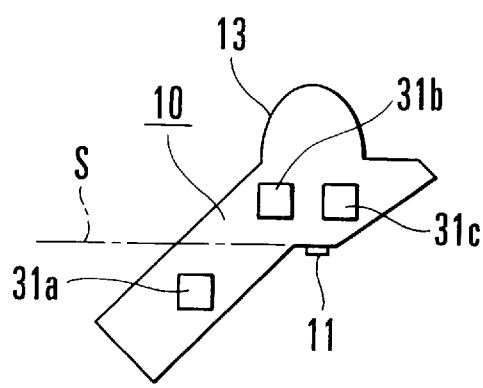

FIGS. 11(a) and 11(b) are side elevation views of a seventh embodiment of the invention.

The LED element 31 is not limited to one in number. For example, as shown in FIGS. 11(a) and 11(b), three LED elements are used in here, thus increasing the illumination on the position to be illuminated.

Also, the light may be changed in wavelength to, for example, red (R), green (G) and blue (B) by using three LED elements 31a, 31b and 31c, respectively. This case is usable in an illumination device for the color image scanner.

It is desirable that all of the three LED elements 31a, 31b and 31c are positioned with their centers of area on the far side of a plane S on which the diffusion area 11 is formed from the exit surface 13 as shown in FIG. 11(a). However, as shown in FIG. 11(b), they may change their positions provided at least one remains with its center of area on the far side of the plane S from the exit surface 13. If so, in a case where the LED elements 31a, 31b and 31c are monocolor, the intensities of light from the three elements are averaged, thus contributing to a somewhat improvement of the uniformity of the illuminance distribution. In another case where the LED elements 31a, 31b and 31c are of three different colors equivalent to the original red, green and blue, if, for at least one of these colors, the illuminance distribution is made uniform, it is possible to simplify the circuit for correcting the electrical signals obtained therefrom.

For example, the red LED element is higher in illuminance than the green or blue LED element. Therefore, its strengths of illuminance over the longitudinal length of the light guide element 10 are more uneven than the other LED elements of low illuminance. On this account, the red LED element of high illuminance is selected to be positioned farther away from the exit surface 13 than the plane S on which to form the diffusion area 11, thus making it possible to decrease the longitudinal unevenness of illuminance distribution of the light guide element 10.

Incidentally, in all the first to seventh embodiments, the light source is not necessarily an LED or LEDs, and may be of any type provided it issues light of high enough intensity. Also, as the LED elements 31a, 31b and 31c orient themselves to the longitudinal direction of the light guide element 10, their positioning is not limited to only one of the ends of the light guide element 10. Some of them may be put on the opposite end. In this case, the coating on the return surface 15 has to be removed.

Figure 12:
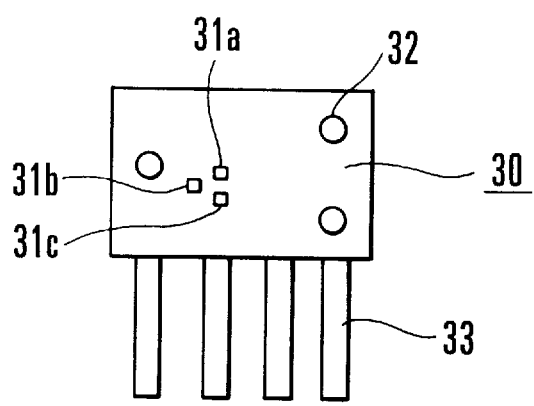
FIG. 12 is a top view of the LED light source in each of the above-described embodiments of the invention.
Figure 13:
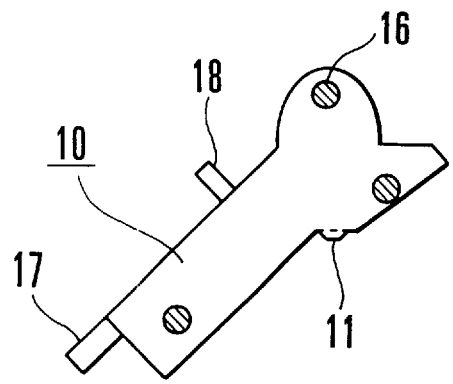
FIG. 13 is a side elevation view of the light guide element in each of the above-described embodiments of the invention.
Figure 14:
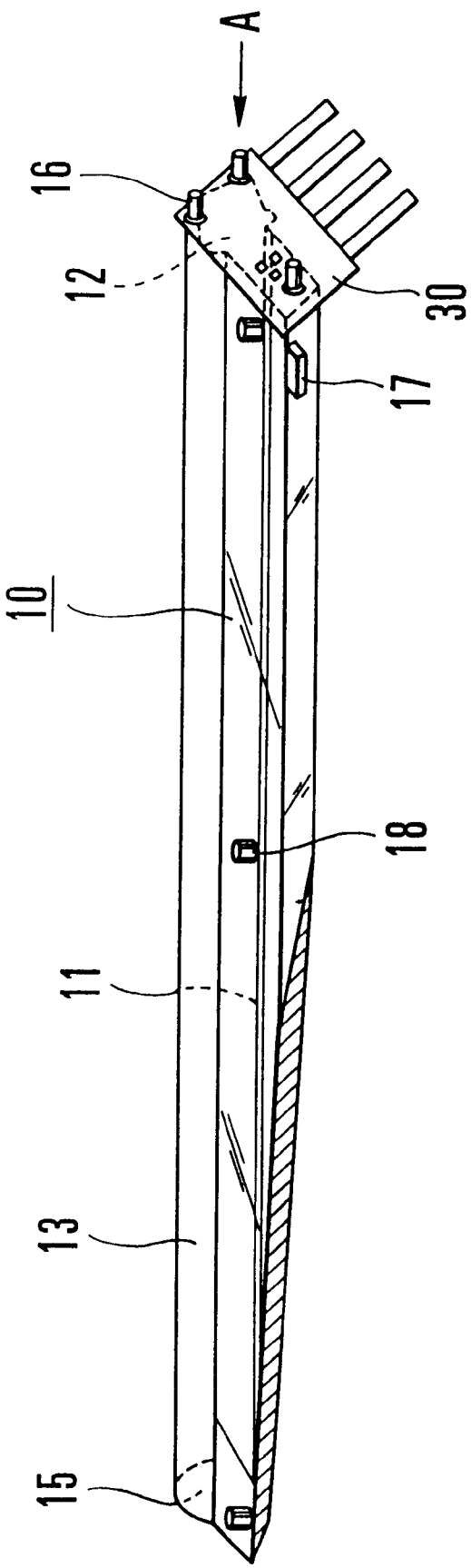
FIG. 14 is a view for explaining the method of producing the illumination device in each of the above-described embodiments of the invention.
Figure 15:
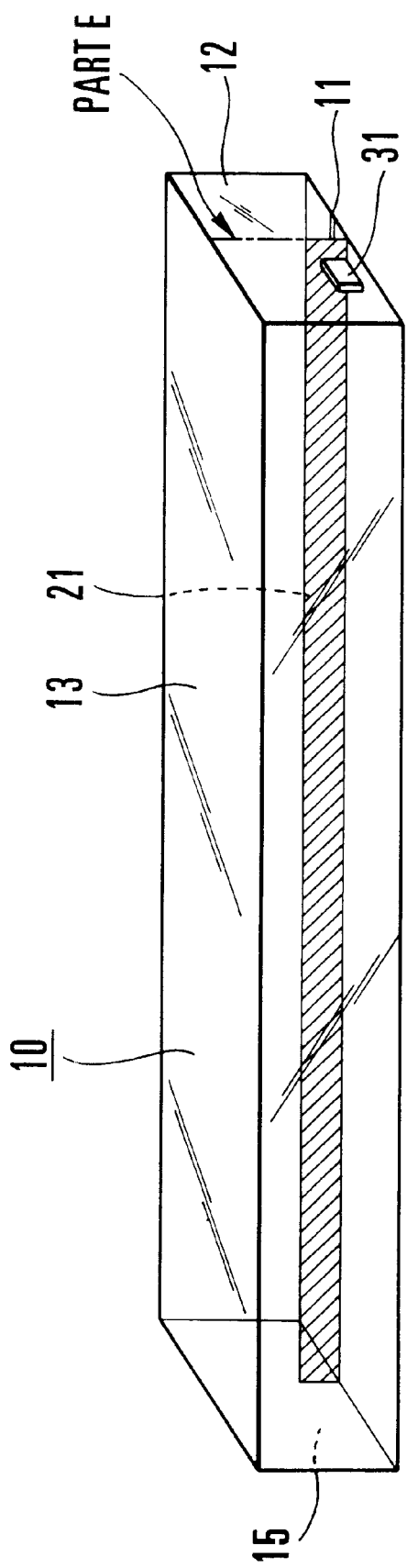
FIG. 15 is a schematic view showing the configuration of an eighth embodiment of the invention.

Next, a method of producing the illumination device in each of the foregoing embodiments is described. FIG. 12 is a top view of the LED light source in the illumination device. FIG. 13 is a side elevation view of the light guide element in the illumination device. FIG. 14 is a view for explaining the method of producing the illumination device.

A light source 30 is, as shown in FIG. 12, constructed with the LED elements 31a, 31b and 31c for emitting red, green and blue light fluxes, respectively, in commonly packaged form. On supply of electric power through four leads 33, they issue the light.

The substrate of the light guide element 10 is made of acrylic resin or like material of excellent light transmittance so that it can be formed by using the injection molding machine or the like. To make the diffusion area 11 in the saw-teeth form, an easy technique is to provide for the metal mold with its shape.

For the diffusion area 11 with a coating, the silk printing or pad printing can be used to form a uniform thick layer reliably.

The LED source 30 is then brought into locking connection with the light guide element 10. To this purpose, as shown in FIG. 13 and FIG. 14, three locating holes 32 in a carrier of the light source 30, while being aligned with respective locator pins 16 on the light guide element 10, is moved from the direction of arrow A. After being inserted to the full length, the pins 16 are caulked.

Further, in the illumination device shown in FIG. 14, the light guide element 10 itself becomes progressively smaller in the width as the distance from the entrance surface 12 to the return surface 15 increases. The combination of such a light guide element 10 with the LED elements set up in the position described above can more effectively eliminate the longitudinal unevenness of illuminance.

Next, eighth to eleventh embodiments of the invention are described by reference to FIGS. 15 to 18, respectively. These embodiments have a common feature that a partition 21 is provided inside the substrate of the light guide element 10 so that the light from the LED element 31 does not directly reach the diffusion area 11. Such a light guide element 10 is made up as follows. In the eighth to eleventh embodiments, the light guide element 10 is divided by a plane E into an outlet segment and a guide segment. So, these segments are first produced in separation and then unified by using an adhering agent. Before this assembling, the partition 21 is formed on a portion of one of the adjoining surfaces by aluminum evaporation or by paint printing. Another method is to recess the adjoining surfaces in the corresponding portions to the partition 21 and then cement them to each other. So, a thin air gap is left at the boundary, functioning as the partition means, since the propagating light undergoes total reflection.

The partition means has to insure that light propagates through the interior of the light guide element 10 with high efficiency. To this purpose, absorption of the light must be as little as possible. In this respect, its surface is desired to be of a mirror. However, the surface may be of scattering light. Even a black or like light absorbing partition can be used. The method of forming the partition 21 is not limited to those described above. Any other methods may be used, provided that the partition 21 is eventually formed in the interior of the substrate of the light guide element 10.

Figure 16:
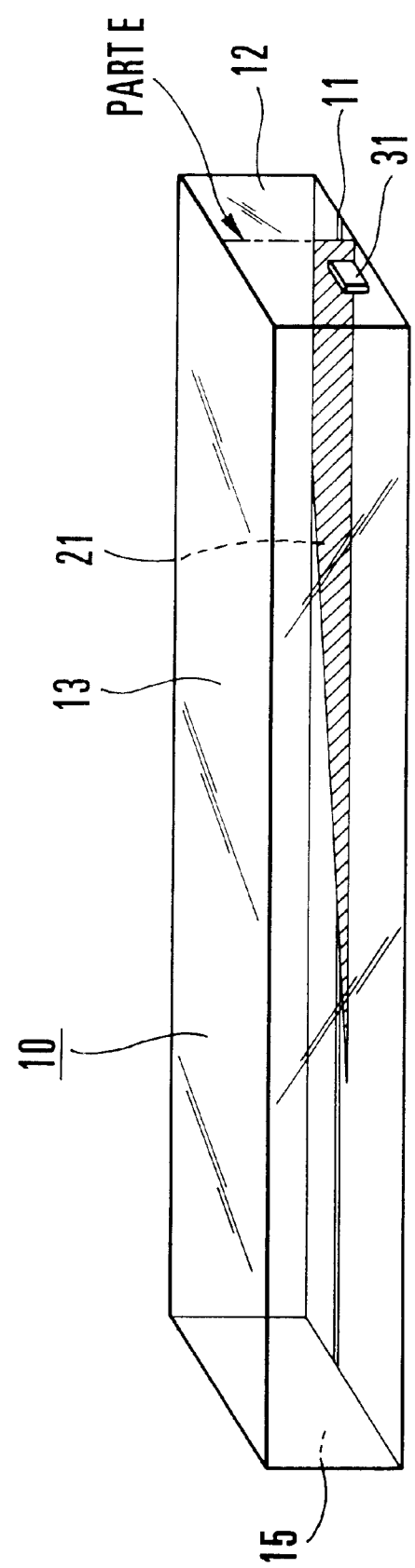
FIG. 16 is a schematic view showing the configuration of a ninth embodiment of the invention.
Figure 17:
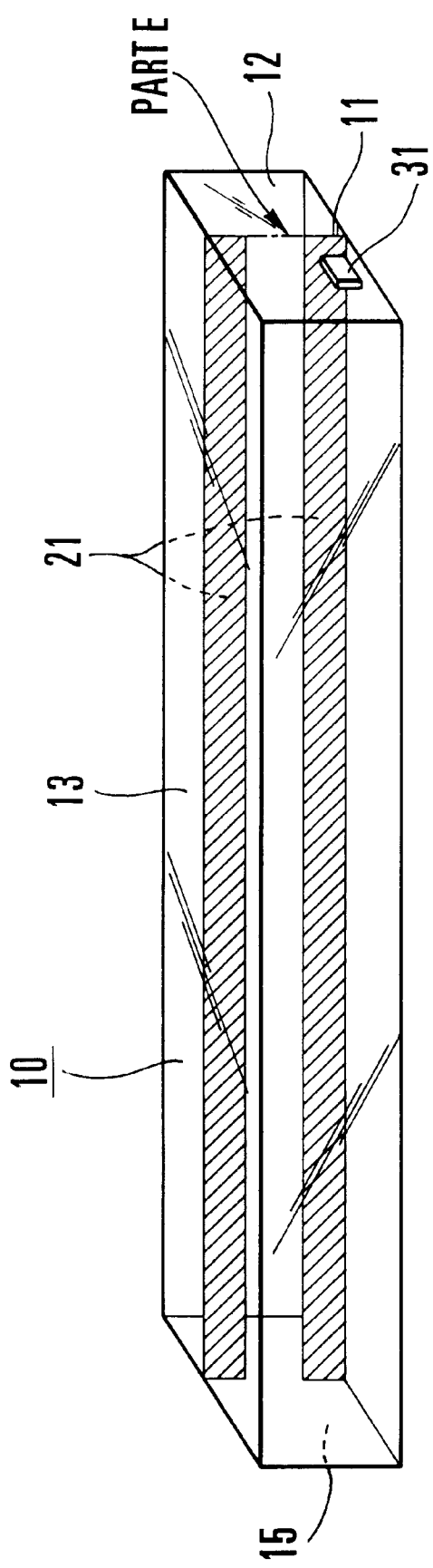
FIG. 17 is a schematic view showing the configuration of a tenth embodiment of the invention.
Figure 18:
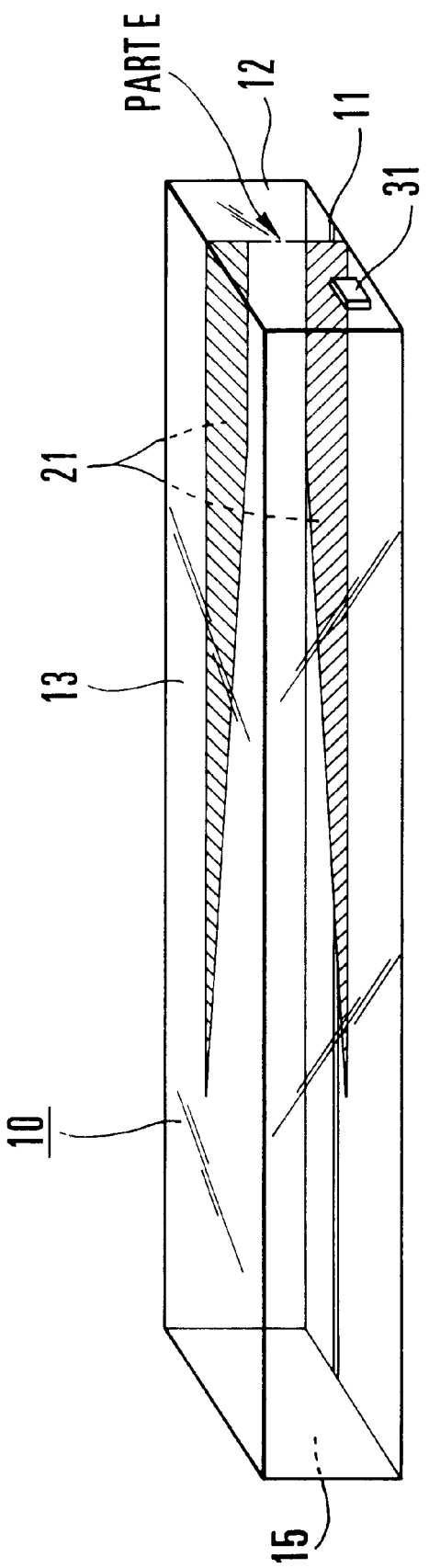
FIG. 18 is a schematic view showing the configuration of an eleventh embodiment of the invention.
Figure 19:
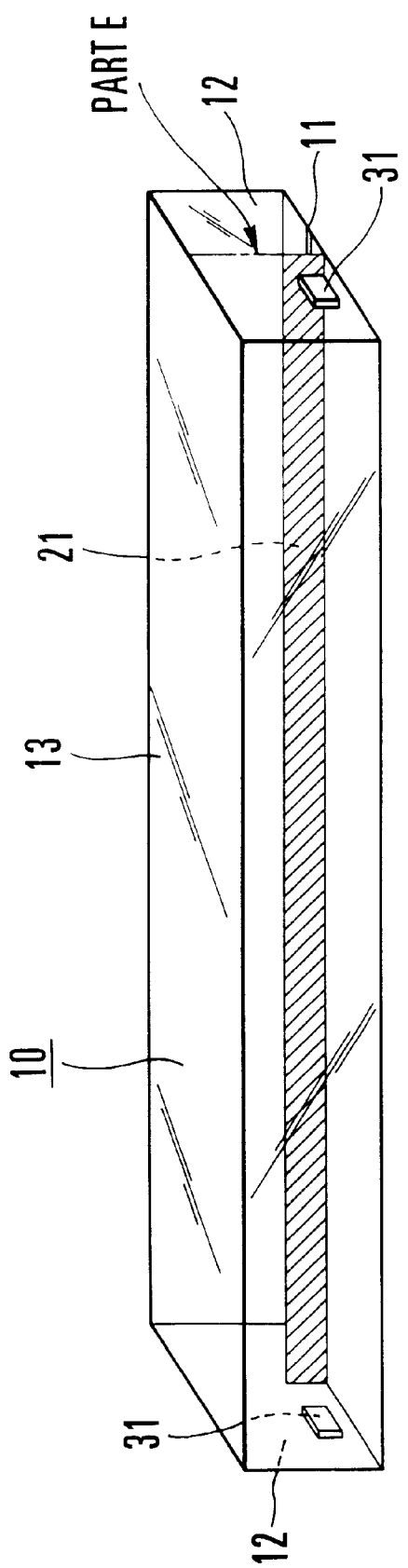
FIG. 19 is a schematic view showing the configuration of a twelfth embodiment of the invention.
Figure 20:
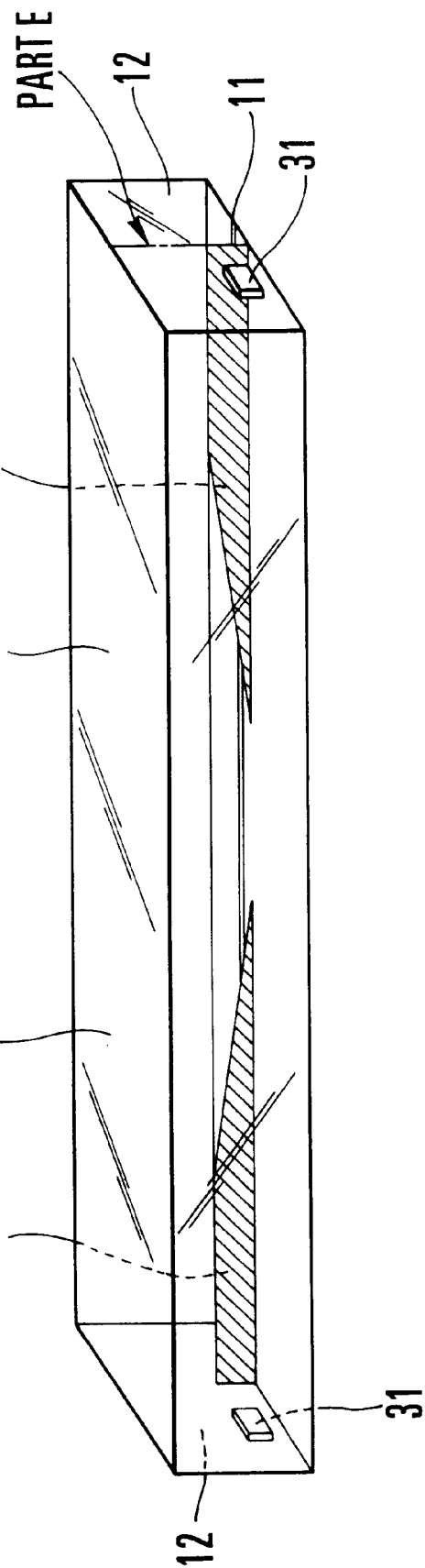
FIG. 20 is a schematic view showing the configuration of a thirteenth embodiment of the invention.
Figure 21:
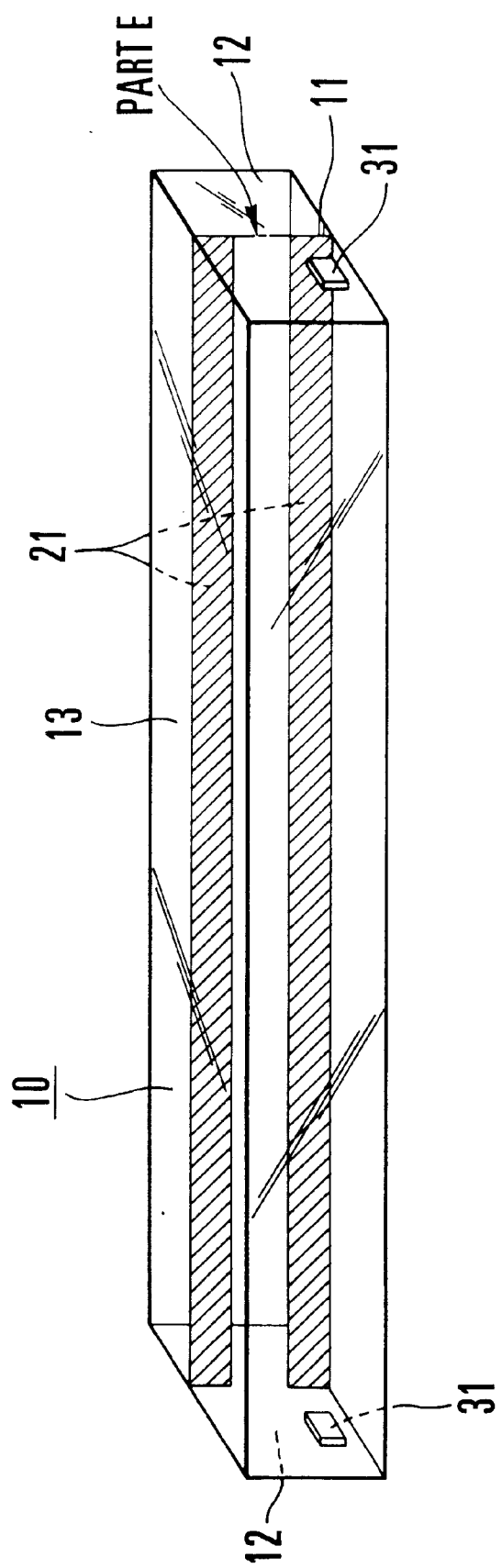
FIG. 21 is a schematic view showing the configuration of a fourteenth embodiment of the invention.
Figure 22:
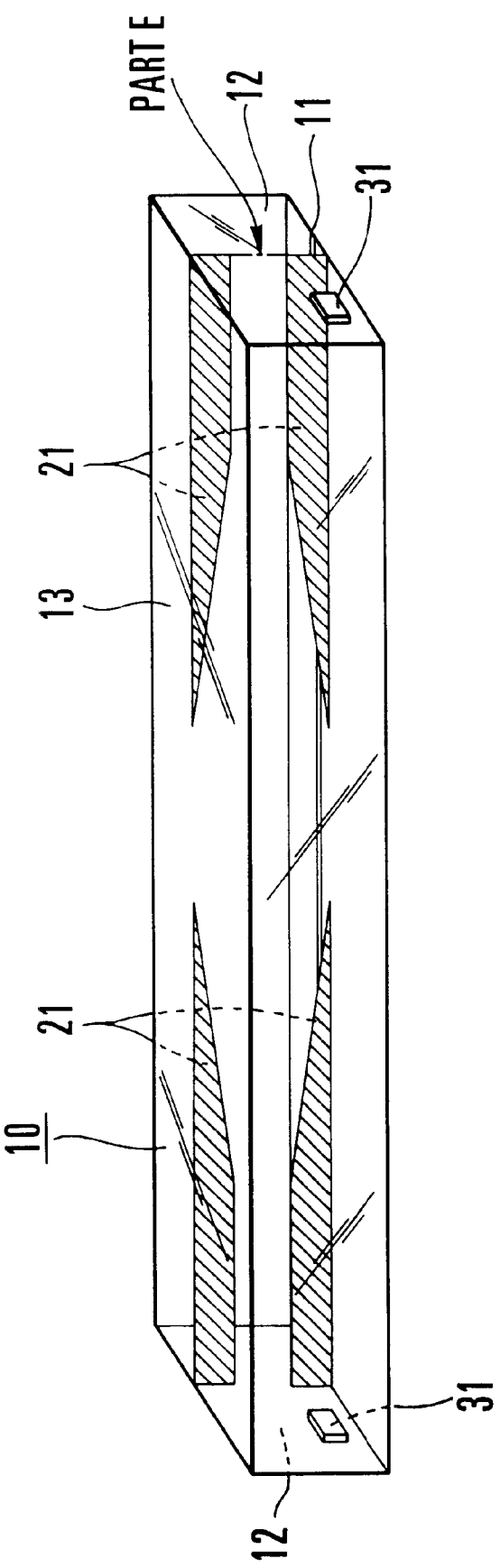
FIG. 22 is a schematic view showing the configuration of a fifteenth embodiment of the invention.

Also, as shown in FIG. 17, two partitions 21 may be used. Their positions, if between the LED element 31 and the diffusion area 11, are arbitrary. Further, the partition width may be changed depending on the distance from the LED element 31 as shown in FIG. 16 and FIG. 18. With such a form, it is possible to more effectively eliminate the longitudinal unevenness of illuminance of the light guide element 10 resulting from the high level only at the neighborhood of the LED element 31.

Further, in twelfth to fifteenth embodiments shown in FIGS. 19 to 22, respectively, the light guide element 10 is not provided with the return surface 15, but two LED elements 31 are used on either of both ends of the substrate thereof. By providing for both ends with the LED elements, the illuminance can be increased as compared with the case of providing for one end.

It will be appreciated from the foregoing that the invention is applied to the type of illumination device in which the light guide element 10 comprises a light-transmissive substrate having an entrance surface 12 for light at one end thereof and a diffusion area 11 formed in the other surfaces than the aforesaid end surface or in one of the side surfaces in the longitudinal direction to reflect and/or scatter the incoming light and an exit surface 13 from which the reflected and/or scattered light emerges to the illuminating direction, and a light source having a light-emitting element positioned adjacent the entrance surface 12. A characteristic feature of the invention is that the center of area of the light-emitting element is disposed on the far side of the plane on which at least part of the diffusion area 11 is formed from the exit surface 13, so that the light from the light-emitting element, after having entered from the entrance surface 12, is prevented from directly reaching the diffusion area 11, that is, the proportion of the direct light to the diffusion area 11 is decreased. In turn, the amount of light which at least once reflects from the other area of the inner walls than the diffusion area 11, or indirect light, can be so much increased. Therefore, the distance to which the light propagates at an acceptable illuminance can be increased, thus improving the unevenness of illuminance that the illuminance is high in the near zone to the light source and becomes progressively lower as the distance increases.

Figure 23:
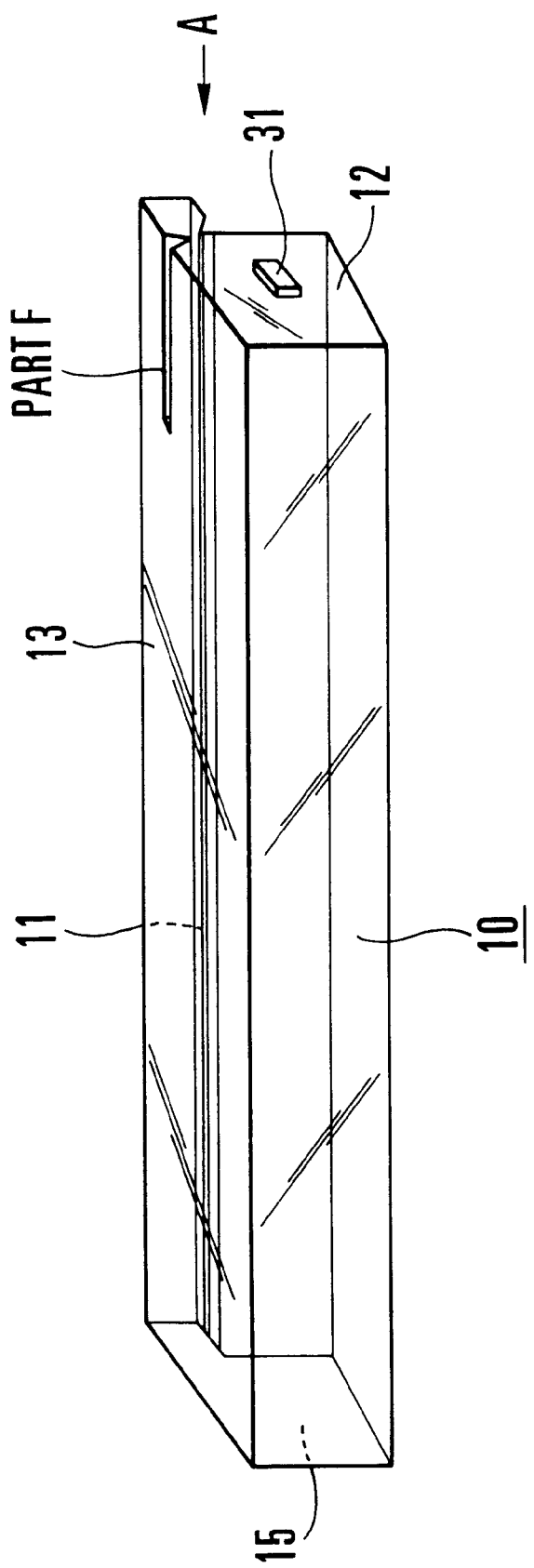
FIG. 23 is a perspective view showing the configuration of a sixteenth embodiment of the invention.
Figure 24:
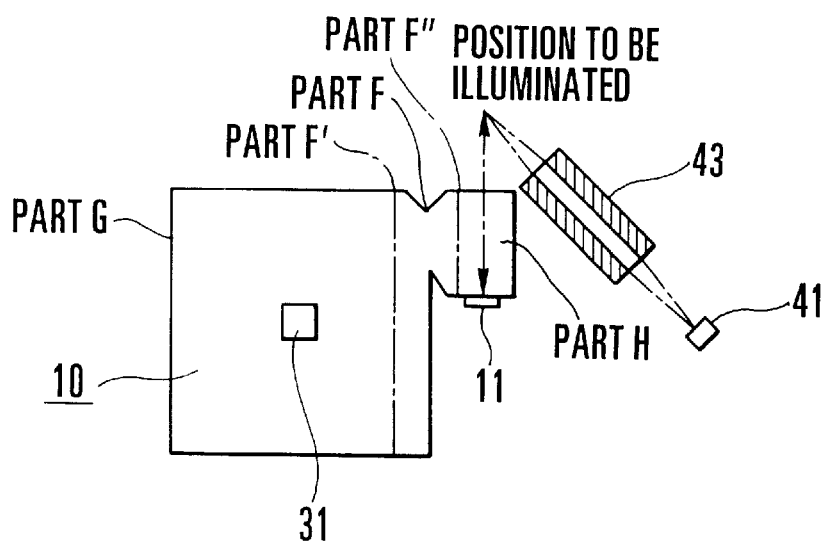
FIG. 24 is a side elevation view of the illumination device shown in FIG. 23.

FIG. 23 is a perspective view of an illumination device according to a sixteenth embodiment of the invention, and FIG. 24 is a side elevation view thereof as looked from the direction of arrow A.

As shown in FIGS. 23 and 24, the illumination device in the sixteenth embodiment comprises a light guide element 10 whose substrate is transmissive of light and formed to a special shape in cross-section and a light source or LED element 31 on one end surface in the longitudinal direction of the light guide element 10. The light emerges from the light guide element 10 at an exit surface 13, as it reflects or scatters from a back surface which confronts it. For this purpose, a diffusion area 11 is formed in a portion of the back surface either by roughening or by applying a reflection coating.

The opposite end to the LED element 31 also reflects the light that has transmitted through the light guide element 10, thus folding the light path backward. For this purpose, a return surface 15 is formed by applying a layer of metal such as aluminum on the end surface of the light guide element 10 itself by the evaporation technique or coating it with a metallic glossy or a reflection layer.

Also, in the sixteenth embodiment, the light guide element 10 is considered comprising a guide segment G on which the LED element 31 is positioned, an outlet segment H in which the diffusion area 11 is formed and an intervening segment F therebetween. The F segment is formed in part of the G segment at a position adjacent to the entrance surface 12 and has a shorter width than those of its surrounding areas F' and F". The passage from the G segment to the H segment is thus narrowed.

The term "outlet segment" used herein refers to that area in the light guide element 10 which passes the reflected or scattered light from the diffusion area 11 to the exit surface 13. The emerging light reaches the position to be illuminated. The other area than that is called the "guide segment".

The term "position to be illuminated" used herein means not merely where the emerging light casts but where it should functionally illuminate, for example, the target at which a photo-electric transducer element 41 looks through a lens array 43.

The light from the LED element 31, as a rule, repeats total reflection from the inner walls of the light guide element 10, as they propagate in its interior, reaching the return surface 15. The light now reverses its direction and comes back to the LED element 31.

It also occurs during such propagation that some of the rays hit the diffusion area 11 and are reflected and/or scattered. A part of them orient themselves to a predetermined direction and emerge from the exit surface 13 to the position to be illuminated or a manuscript. The other part is reflected again within the light guide element 10, proceeding with the propagation.

In the sixteenth embodiment, as described above, the LED element 31 lies on the entrance surface of the light guide or segment G and the diffusion area 11 lies on the outlet or segment H. Accordingly, the segment F constituting part of the light guide element 10 is narrowed at a position near the entrance surface 12 to restrict the light that goes from the segment G to the segment H, thus sufficiently eliminating the longitudinal unevenness of illuminance of the light guide element 10 which would otherwise result from letting the illuminance be high only in the near zone to the entrance surface 12 with the LED element 31 thereon.

Also, the light that is stopped by the narrowed segment F from going from the segment G to the segment H proceeds to propagate through the interior of the segment G in the direction from the LED element 31 to the return surface 15, reaching a farther distance. The illuminance on the position to be illuminated is made more uniform over the longitudinal length of the light guide element 10.

Figure 25A:
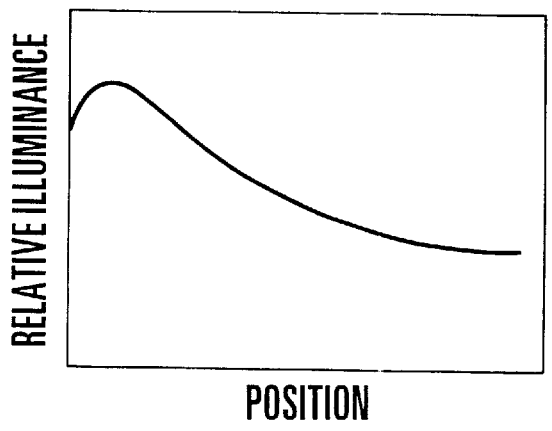
FIGS. 25(a) and 25(b) are graphs of the illuminance distribution of the illumination device.
Figure 25B:
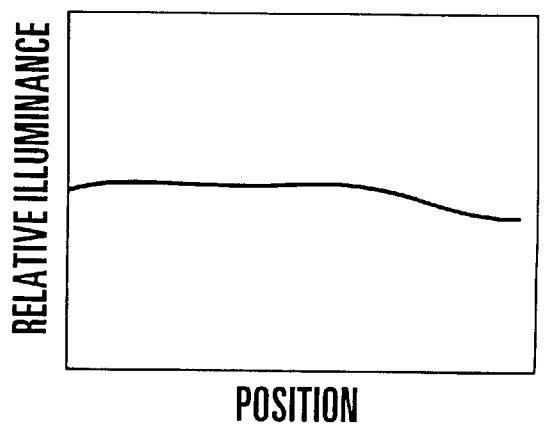

FIGS. 25(a) and 25(b) show the illuminance distributions of the illumination devices. For the conventional illumination device, when the cross-sectional area of the light guide element is reduced, the illuminance is distributed over the longitudinal length as shown in FIG. 25(a). For the illumination device of the sixteenth embodiment, when the cross-sectional area of the light guide element is similarly reduced, the illuminance is distributed over the longitudinal length as shown in FIG. 25(b). As is apparent from the graphs, in the illumination device of the sixteenth embodiment, even when reduced in size, an almost flat illuminance distribution can be obtained.

Figure 26A:
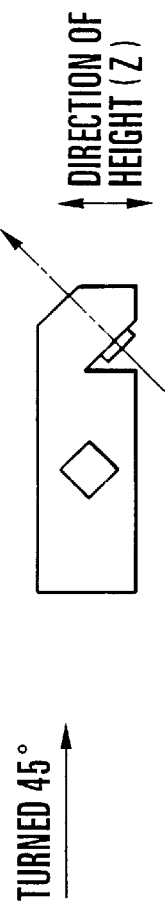
FIGS. 26(a) and 26(b) are side elevation views showing the configuration of a seventeenth embodiment of the invention.
Figure 26B:
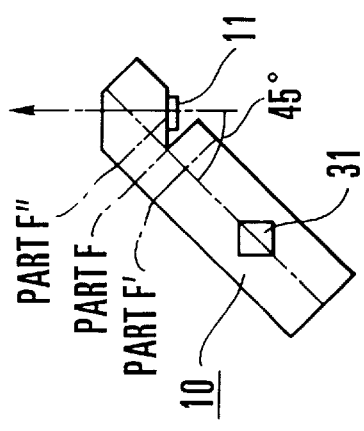

FIGS. 26(a) and 26(b) are side elevation views showing the construction of a seventeenth embodiment of the invention. The turning of FIG. 26(a) through 45° clockwise in the paper gives FIG. 26(b).

The ways to use the illumination device are classified to two main groups, one of which is that the light is cast perpendicularly to the manuscript to read and the other of which is to hold it in a tilted position to a certain angle with the manuscript. The latter way is chiefly chosen in the general case.

For the illumination device adapted to be used in the tilted position to a certain angle, the demand for reduction of the size is realized by the thinning of the housing therefor.

So, in the seventeenth embodiment, to meet the demand for reduction of the size, particularly for thinning of the height, the form of the illumination device is so determined as to hold it in a 45° tilted position to the manuscript. In other words, as shown in FIG. 26(a), the light guide element 10 is formed to a slender shape as elongated farther away from the position to be illuminated to a direction of 45° with respect to a line drawn from the diffusion area 11 at right angles to the position to be illuminated (or the normal line of the diffusion area 11).

Accordingly, as is apparent from FIG. 26(b) or the actually installed position derived from the position of FIG. 26(a) by turning through 45°, the thinning is realized in the direction of height. Also, in the seventeenth embodiment, the segment F is narrowed so that the width is smaller than those of its surrounding areas F' and F".

It should be noted that the aforesaid angle is not limited to 45° and, needless to say, can take any value in the case of employing the tilted type.

Figure 27:
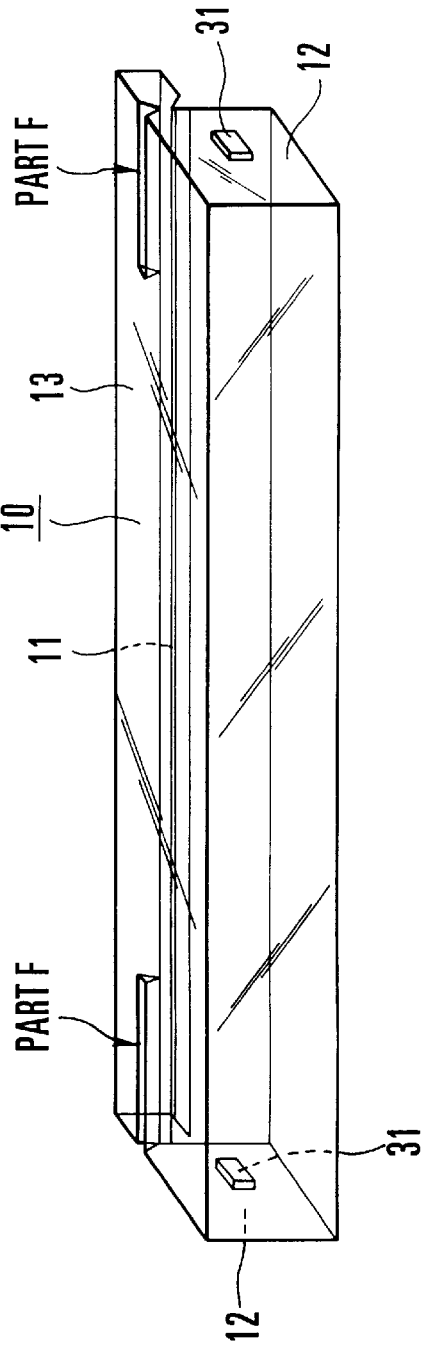
FIG. 27 is a perspective view showing the configuration of an eighteenth embodiment of the invention.

In an eighteenth embodiment shown in FIG. 27, the light guide element 10 is not provided with the return surface 15 shown in FIG. 23, but two LED elements 31 are used on either ends of the substrate thereof to increase the illuminance. In this case, for both ends of the light guide element 10, the two segments F that are the passages from the guide segment to the outlet segment are narrowed at the positions adjacent to the entrance surfaces. So, the unevenness of illuminance resulting from the high illuminance only at both ends of the light guide element 10 is sufficiently eliminated.

Figure 28A:
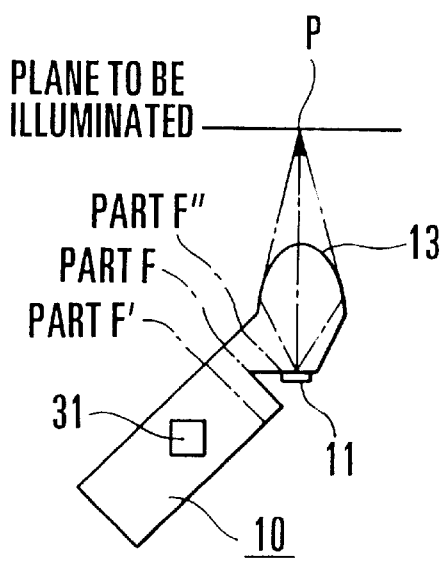
FIGS. 28(a), 28(b), 28(c) and 28(d) are side elevation views showing the configuration of a nineteenth embodiment of the invention.

FIGS. 28(a) to 28(d) show a nineteenth embodiment of the invention. In here, four examples of the form are made slightly different from one to another as schematically shown in the side elevation views of FIGS. 28(a), 28(b), 28(c) and 28(d). Of these, the example of FIG. 28(a) is shown in a perspective view of FIG. 29.

In the nineteenth embodiment, the exit surface 13 is made to have a lens shape. As the entirety of the exit surface 13 condenses light, the illumination on the position to be illuminated is increased over the entire length of the light guide element 10.

Also, as shown in FIG. 29, the light guide element 10 in the nineteenth embodiment has its passage from the guide segment to the outlet segment made narrower over the entire longitudinal length.

Here, as one of the largest categories of application of the illumination device, there are, for example, the scanners. The scanners are divided into two main types, one of which is to move the manuscript when being read by the reading sensor, or the sheet-through type and the other of which is to move the reading sensor, while the manuscript is stationary, or flat-bed type.

For the sheet-through type, the spatial relationship in height between the manuscript and the illumination device does not almost change during scanning. Therefore, even if the width to which the light is condensed is considerably short, no problem arises. Conversely, for the flat-bed type, such a relationship delicately changes. Therefore, it is desired that the width of condensation of the light is somewhat wide.

By the way, in the case where the exit surface 13 is of the lens shape, the contour such as curvature of the lens is varied with the aim of changing the width of light condensation in the lateral direction of the cross section. This causes large variation of the illuminance distribution in the longitudinal direction. So, it is difficult to find the condition that satisfies the most adequate features of the width of light condensation and the longitudinal illumination distribution at the same time.

The reason for this is that, as the light propagates in the interior of the light guide element 10, it recycles the travel from the guide segment to the outlet segment and vice versa a number of times. During this time, reflection occurs now from the inner walls of the guide segment, then from the inner wall of the outlet segment. So, the shape of the lens surface largely affects the guiding of the light.

On this account, in the nineteenth embodiment, the light guide element 10 is narrowed in part, thereby producing an effect of letting the guide segment and the outlet segment have optical independence of each other. Therefore, the lens shape of the outlet segment, even if changed, gives a lesser influence on the longitudinal illumination distribution. The narrowing of the passage produces an additional advantage of increasing the degree of freedom of design.

With such a construction and arrangement of FIG. 28(a), the light from the LED element 31 propagates in the interior of the light guide element 10, while repeating total reflection from the inner walls thereof. At a time during such propagation, the light hits the diffusion area 11 and is reflected and/or scattered. A part of the light orients itself to the illuminating direction and emerges from the exit surface 13, being projected onto the position to be illuminated, or the manuscript.

Since the aforesaid exit surface 13 has the lens shape, the light beam issuing from the exit surface 13 to the manuscript is focused by the action of the lens of the exit surface 13 to a point P or thereabout on the plane to be illuminated. For this event, it is not always necessary to establish the exact image forming relationship between the diffusion area 11 and the point P to be illuminated.

It is also to be noted that the lens surface may be made so loose in curvature that the reflected and/or scattered rays from the diffusion area 11 do not all converge to one point (P). Even if so, such an exit surface 13 have more of a function somewhat like that of bringing the rays that pass therethrough to approach the point P than when it is made flat. The illumination at the point P is thus increased. That is, the effect of condensing the light is produced.

In the nineteenth embodiment, the light guide element 10 shown in FIG. 28(a) has a narrower width at the segment F thereof than those of its surrounding portions F' and F". This example of the form is to provide the narrowed segment F in part of the guide segment at a position slightly far from the outlet segment that is the area through which the reflected and/or scattered rays from the diffusion area 11 pass to the exit surface 13, reaching the position to be illuminated.

Figure 28B:
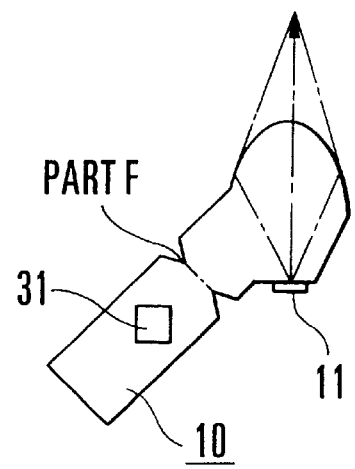

In the example of FIG. 28(b), two narrowed segments F are provided in part of the guide segment at positions even more far from the outlet segment. One of such narrowed portions is obtained by deforming part of a surface 19 which is contiguous to the diffusion area 11 and the other one by deforming part of another surface 20 which is contiguous to the exit surface 13.

Figure 28C:
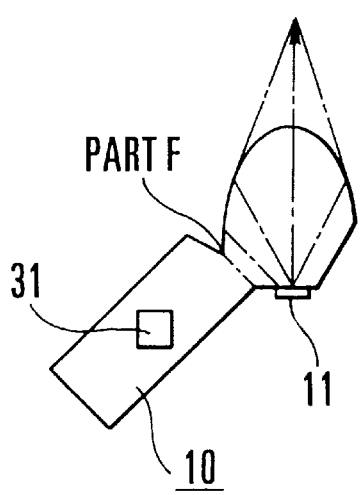

In the example of FIG. 28(c), a narrowed portion F is formed in the skirt of the lens-shaped portion of the exit surface 13. In this example, the narrowed segment F takes its place at the boundary between the guide segment and the outlet segment.

In the case where the narrowed segment F is positioned at the boundary between the outlet and guide segments as in this example, it is easy to control the position and orientation of the light going from the guide segment to the outlet segment by varying the shape and position of the narrowed portion.

The orientation of the light bundle entering the diffusion area 11 and the bundle of the reflected and/or scattered rays to the exit surface, too, can be controlled. Therefore, the shape of the light condensing portion can be accurately designed and a better light condensed state can be made out.

Figure 28D:
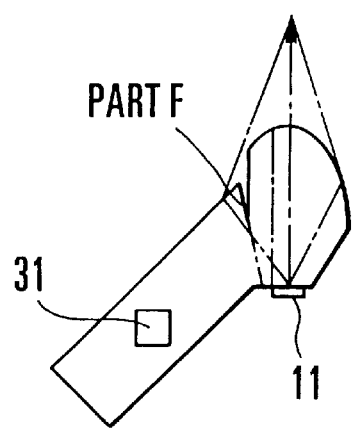

In the example of FIG. 28(d), a narrowed segment F is formed in part of the outlet segment. Like this, the narrowed portion can take its place not only in part of the guide segment or in the neighborhood of the boundary between the guide and outlet segments but also in the outlet segment.

However, as a rule, the segment F is better not too much deep into the outlet segment, so that good characteristic is easy to obtain. In this example, the narrowed segment F is provided in the exit surface 13 but out of the light condensing portion, that is, at the boundary between the light condensing portion and the regular flat plane.

In a twentieth embodiment shown in FIG. 30, the light guide element 10 is not provided with the return surface 15 shown in FIG. 29, but two LED elements 31 are used on either ends of the substrate thereof to increase the illuminance. In this case, the unevenness of illuminance resulting from the high illuminance at only one end of the light guide element 10 is sufficiently eliminated.

Figure 31A:
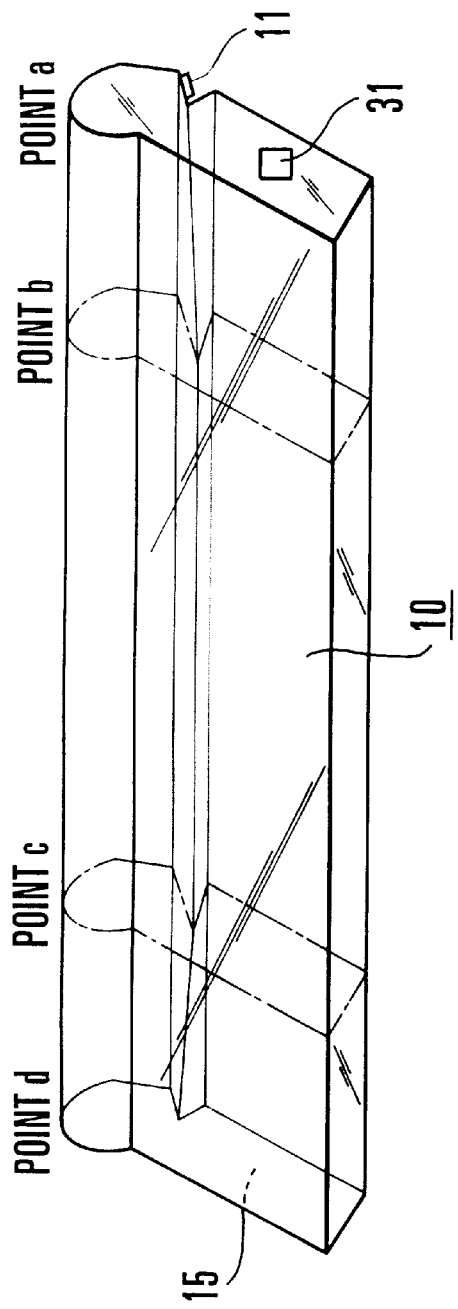
FIGS. 31(a), 31(b) and 31(c) are construction views showing the configuration of a twenty-first embodiment of the invention.
Figure 31C:
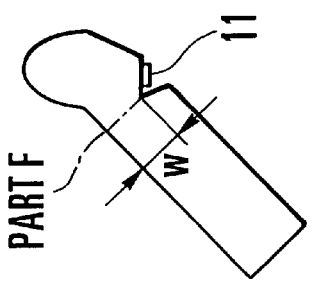
Figure 31B:
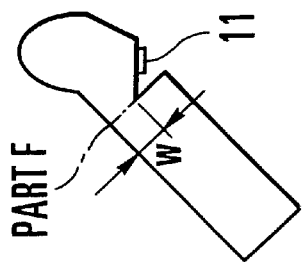

FIGS. 31(a) to 31(c) show a twenty-first embodiment of the invention, with FIG. 31(a) being a perspective view of the light guide element and FIGS. 31(b) and 31(c) being cross sectional views taken at points "a", "b", "c" and "d" of the perspective view. In the nineteenth and twentieth embodiments described above, the light guide element 10 had its passage from the guide segment to the outlet segment narrowed to a constant degree over the entire longitudinal length thereof. In the twenty-first embodiment, on the other hand, the degree of narrowness is finely adjusted as it varies in the entire length of the light guide element 10, so that the illuminance distribution is made even more uniform.

In more detail, in the case where the degree of narrowness is constant over the entire longitudinal length of the light guide element 10 as shown in FIG. 29, since the distance through which the light from the LED element 31 goes to the diffusion area 11 and therefrom to the exit surface 13 is increased by the narrowing, for the near zone to the entrance surface 12 of the light guide element 10, the illuminance on the position to be illuminated becomes slightly lower. For the zone near to the return surface 15, the absolute amount of light propagated thereto by the light guide element 10 decreases. Therefore, the amount of light arriving at the diffusion area 11 decreases. So, the illumination on the position to be illuminated becomes slightly lower.

On this account, in the twenty-first embodiment, for the near zone to the entrance surface 12 between the points "a" and "b" and the near zone to the return surface 15 between the points "c" and "d", the width "w" of the gate in the narrowed portion is made wider than that for the central zone between the points "b" and "c", thus increasing the amount of light hitting the diffusion area 11 in the marginal zones.

Figure 32:
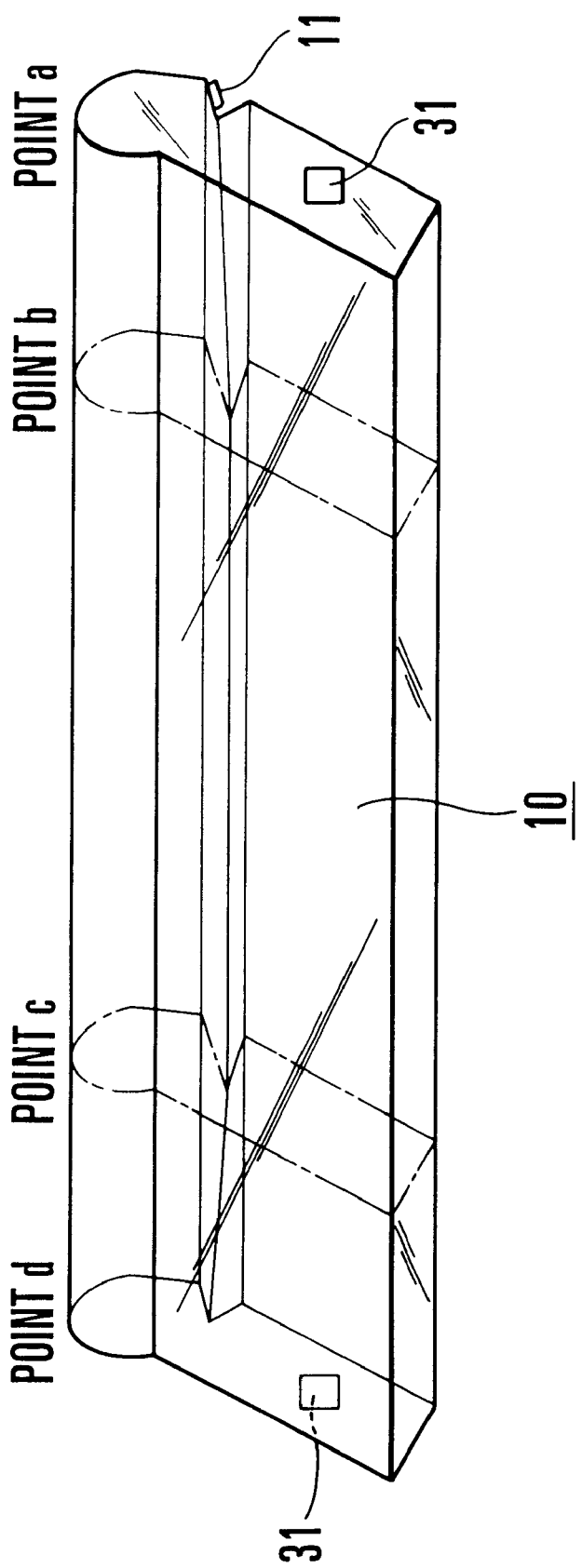
FIG. 32 is a perspective view showing the configuration of a twenty-second embodiment of the invention.

In a twenty-second embodiment, shown in FIG. 32, the light guide element 10 is not provided with the return surface 15 shown in FIGS. 31(a) to 31(c), but two LED elements 31 are used on either ends thereof to increase the illuminance. In this case, the unevenness of illuminance resulting from the high illuminance at only one end of the light guide element 10 is sufficiently eliminated.

Figure 33A:
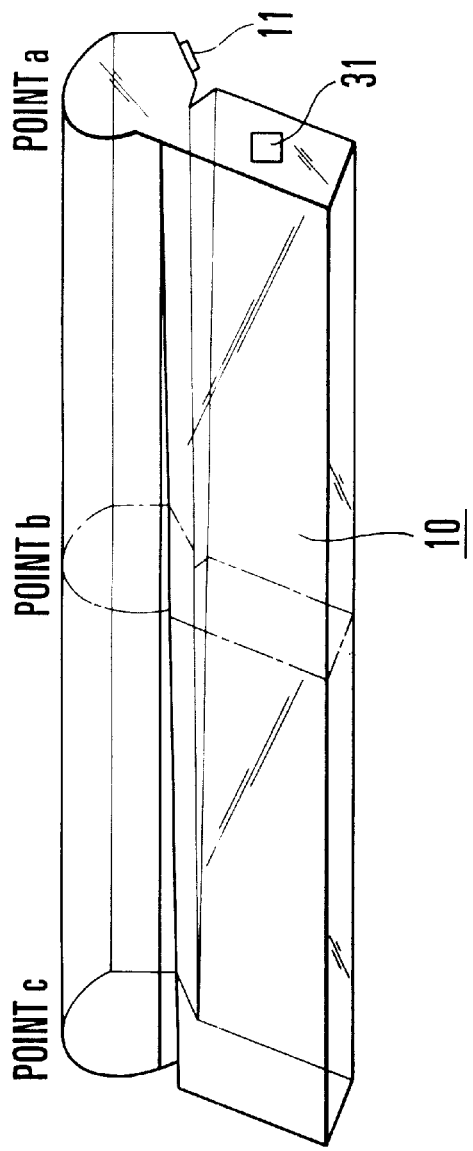
FIGS. 33(a), 33(b), 33(c) and 33(d) are construction views showing the configuration of a twenty-third embodiment of the invention.
Figure 33B:
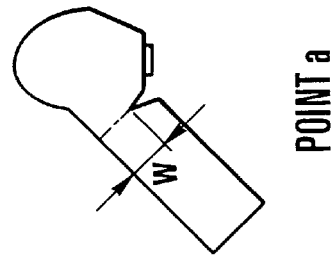
Figure 33C:
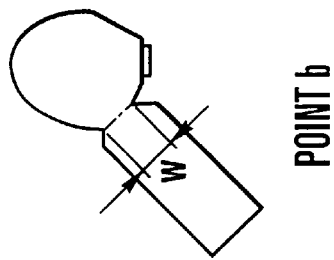
Figure 33D:
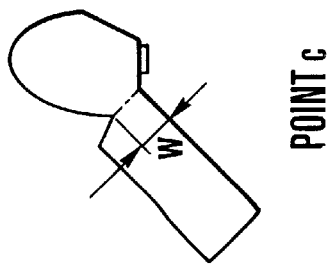

FIGS. 33(a) to 33(d) show a twenty-third embodiment of the invention with FIG. 33(a) being a perspective view of the light guide element and FIGS. 33(b), 33(c) and 33(d) being cross sectional views taken along lines passing points "a", "b" and "c" in the perspective view of the light guide element 10.

The twenty-third embodiment is not to change the degree of narrowness but to make changing shapes of each of two narrowed portions over the longitudinal length.

That is, the behavior of the light propagating in the interior of the light guide element 10, strictly speaking, delicately differs with different positions in the longitudinal direction. Therefore, the artisan does not always recourse to the change of the width "w" of the gate in the narrowed portion. If the shape changes as such, a similar improved result is obtained.

Figure 34:
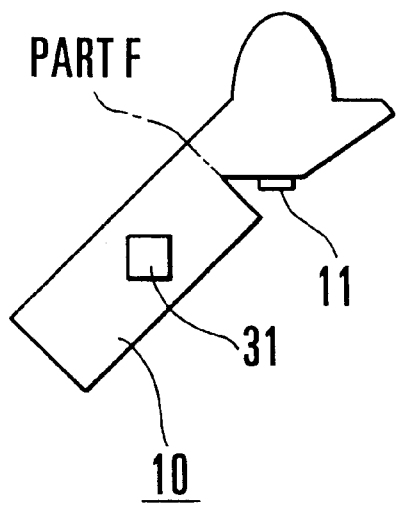
FIG. 34 is a side elevation view showing the configuration of a twenty-fourth embodiment of the invention.

FIG. 34 is a side elevation view of a twenty-fourth embodiment of the invention.

In the twenty-fourth embodiment, the light guide element 10 is as far elongated on the opposite side of the diffusion area 11 to that with the LED element 31 as the space permits. This makes it possible to propagate the light to even more remote a distance.

Figure 35:
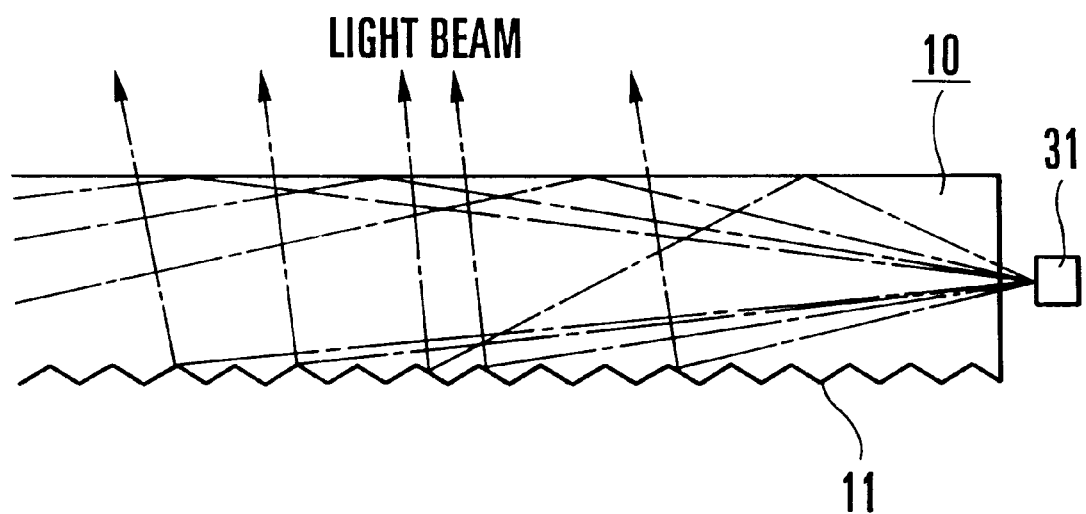
FIG. 35 is a geometry of construction showing the configuration of a twenty-fifth embodiment of the invention.

FIG. 35 is a fragmentary sectional view of a twenty-fifth embodiment of the invention with the diffusion area 11 shown in enlarged scale.

As in the twenty-fifth embodiment, instead of roughening a portion of the light guide element 10, or applying a diffuse reflection coating thereto to form the diffusion area 11 so that the manuscript is illuminated by the diffuse reflection, it is preferable that the diffusion area 11 is otherwise formed by machining that portion to a saw teeth shape as shown in FIG. 35 and then coating it with a metal layer by evaporation or applying a metallic glossy coating to it so that the position to be illuminated receives the specular reflection. The efficiency of illumination is thus improved.

Also, the saw teeth-shaped portion for the diffusion area 11 may be left not coated with the metal layer or metallic glossy layer, relying only on the total reflection due to the difference in refractive index at the boundary between the light guide element 10 and the air.

Figure 36A:
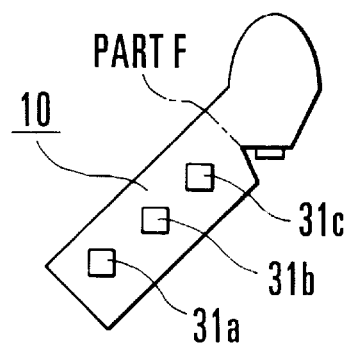
FIGS. 36(a) and 36(b) are side elevation views showing the configuration of a twenty-sixth embodiment of the invention.
Figure 36B:
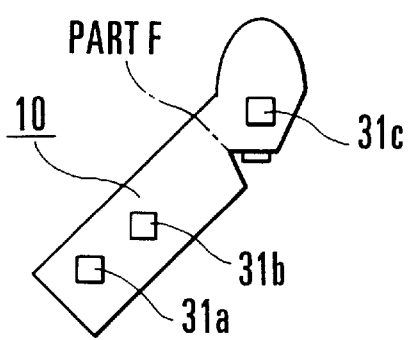

FIGS. 36(a) and 36(b) are side elevation views of a twenty-sixth embodiment of the invention.

The LED element 31 is not limited to one in number. For example, as shown in FIGS. 36(a) and 36(b), three LED elements are used in here, thus increasing the illumination on the position to be illuminated.

Also, the light may be changed in wavelength to, for example, red (R), green (G) and blue (B) by using three LED elements 31a, 31b and 31c, respectively. This case is usable in an illumination device for the color image scanner.

It is desirable that all of the three LED elements 31a, 31b and 31c are positioned with their centers of area on the far side of a plane S on which the diffusion area 11 is formed from the exit surface 13 as shown in FIG. 36(a). However, as shown in FIG. 36(b), they may change their positions provided at least one remains with its center of area on the far side of the plane S from the exit surface 13. If so, in a case where the LED elements 31a, 31b and 31c are monocolor, the intensities of light from the three elements are averaged, thus contributing to a somewhat improvement of the uniformity of the illuminance distribution. In another case where the LED elements 31a, 31b and 31c are of three different colors equivalent to the original red, green and blue, if, for at least one of these colors, the illuminance distribution is made uniform, it is possible to simplify the circuit for correcting the electrical signals obtained therefrom.

Incidentally, in all the embodiments described above, the light source is not necessarily an LED or LEDs, and may be of any type provided it issues light of high enough intensity. Also, as the LED elements 31a, 31b and 31c orient themselves to the longitudinal direction of the light guide element 10, their positioning is not limited to only one of the ends of the light guide element 10. The return surface 15 may be removed so that some of LED elements can be put there.

Figure 37:
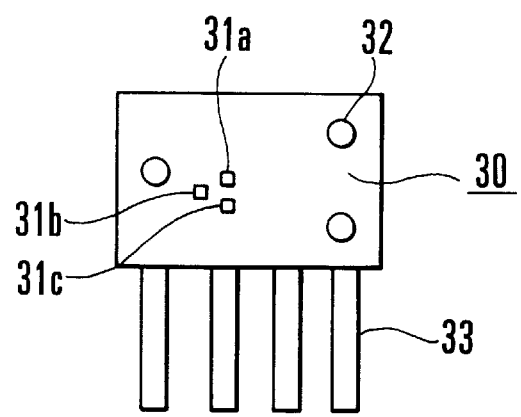
FIG. 37 is a top view of the LED light source in each of the above-described embodiments of the invention.
Figure 38:
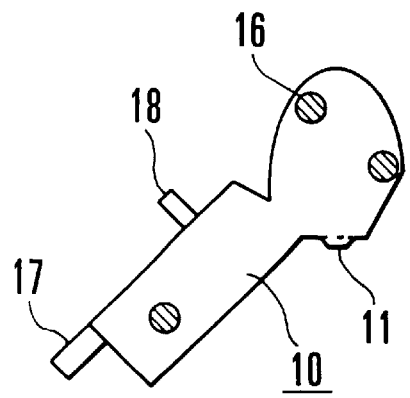
FIG. 38 is a side elevation view of the light guide element in each of the above-described embodiments of the invention.
Figure 39:
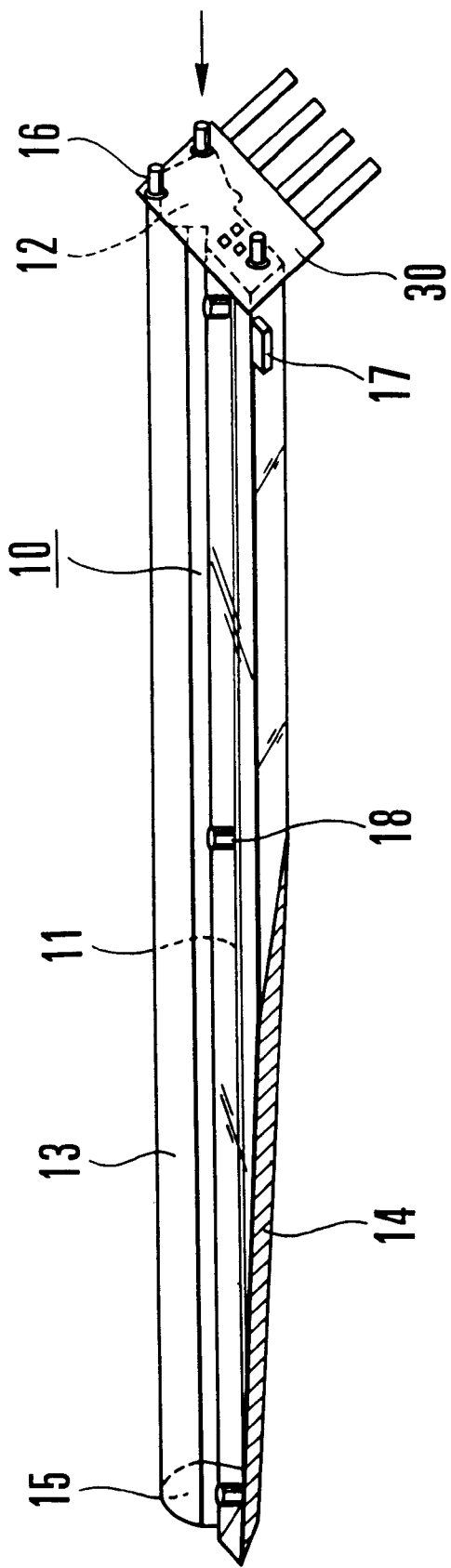
FIG. 39 is a view for explaining the method of producing the illumination device in each of the above-described embodiments of the invention.

Next, a method of producing the illumination device according to the invention is described. FIG. 37 is a top view of the LED light source in the illumination device. FIG. 38 is a side elevation view of the light guide element in the illumination device. FIG. 39 is a view for explaining the method of producing the illumination device.

A light source 30 is, as shown in FIG. 37, constructed with the LED elements 31a, 31b and 31c for emitting red, green and blue light fluxes, respectively, in commonly packaged form. On supply of electric power through four leads 33, they issue the light.

The substrate of the light guide element 10 is made of acrylic resin or like material of excellent light transmittance so that it can be formed by using the injection molding machine or the like. To make the diffusion area 11 in the saw-teeth form, an easy technique is to provide for the metal mold with its shape.

For the diffusion area 11 with a coating, the silk printing or pad printing can be used to form a uniform thick layer reliably.

The LED source 30 is then brought into locking connection with the light guide element 10. To this purpose, as shown in FIG. 39, three locating holes 32 in a carrier of the light source 30, while being aligned with respective locator pins 16 on the light guide element 10, are moved from the direction of arrow A. After being inserted to the full length, the pins 16 are caulked.

Next, an example of application of the illumination device of the invention to the information processing apparatus is described by using the drawings.

Figure 40:
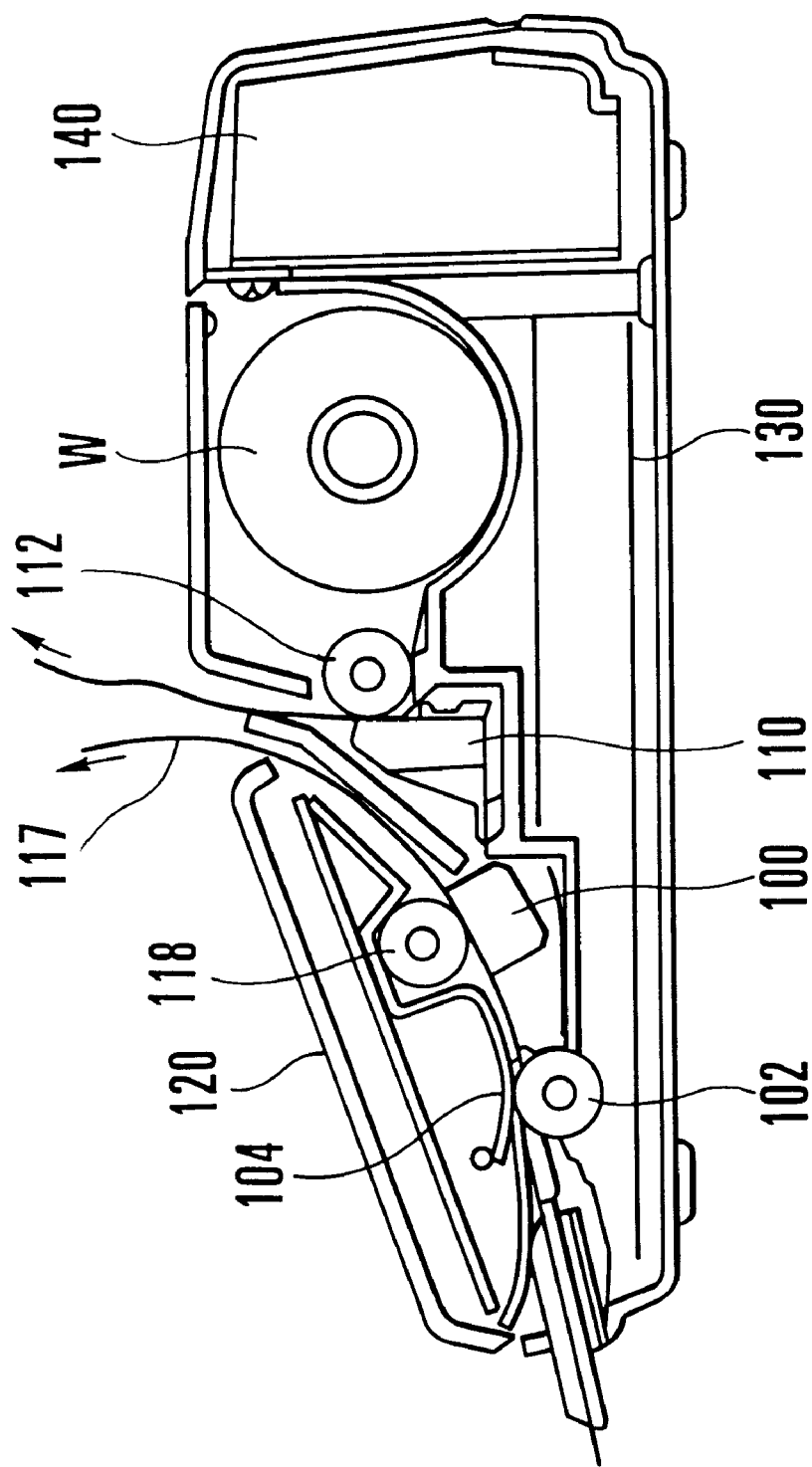
FIG. 40 is a schematic view of the construction of an information processing apparatus using the illumination device according to the invention.

FIG. 40 is a schematic view of the construction of an example of the information processing apparatus (for example, facsimile telegraph) using a photo-electric transducer device.

In FIG. 40, a feed roller 102 moves a manuscript 117 to a reading position. A separator 104 insures feeding of the manuscript 117 reliably one sheet after another. A convey roller 118 is positioned adjacent to the photo-electric transducer device 100 to regulate the position of the surface to be read, as the manuscript 117 moves.

A recording medium W is in the form of, in this instance, a roll paper, on which to record the image information either read by the photo-electric transducer device 100, or received from the outside by the facsimile telegraph.

A recording head 110 forms an image. The thermal head, the ink jet head or any other various heads can be used. Also, the recording head 110 may be of the serial type, or the line type.

A platen roller 112 conveys the recording medium W to the recording head 110 and regulates the surface to be recorded. An operation panel 120 has keys and a display. A system control board 130 is composed of a controller for various portions, a driving circuit for the photo-electric transducer, a processor for image information, an electrical signal transmitter, a receiver and others. Reference numeral 140 denotes an electric power source.

Figure 41:
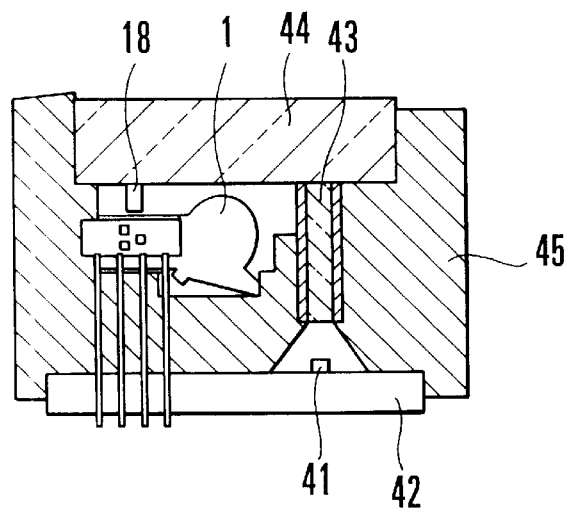
FIG. 41 is a sectional view showing the arrangement of a photo-electric transducer device in the information processing apparatus shown in FIG. 40.
Figure 42:
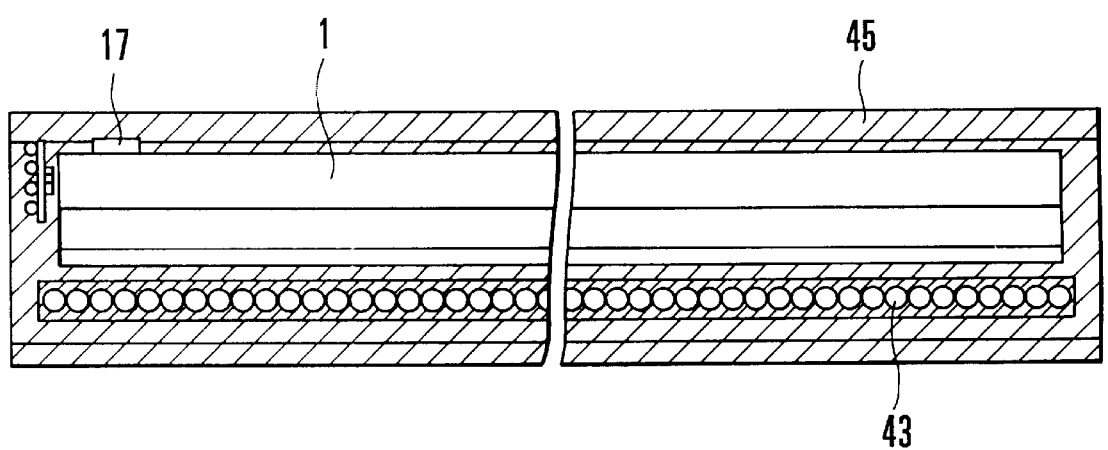
FIG. 42 is a top view showing the arrangement of the photo-electric transducer device in the information processing apparatus shown in FIG. 40.
Figure 43:
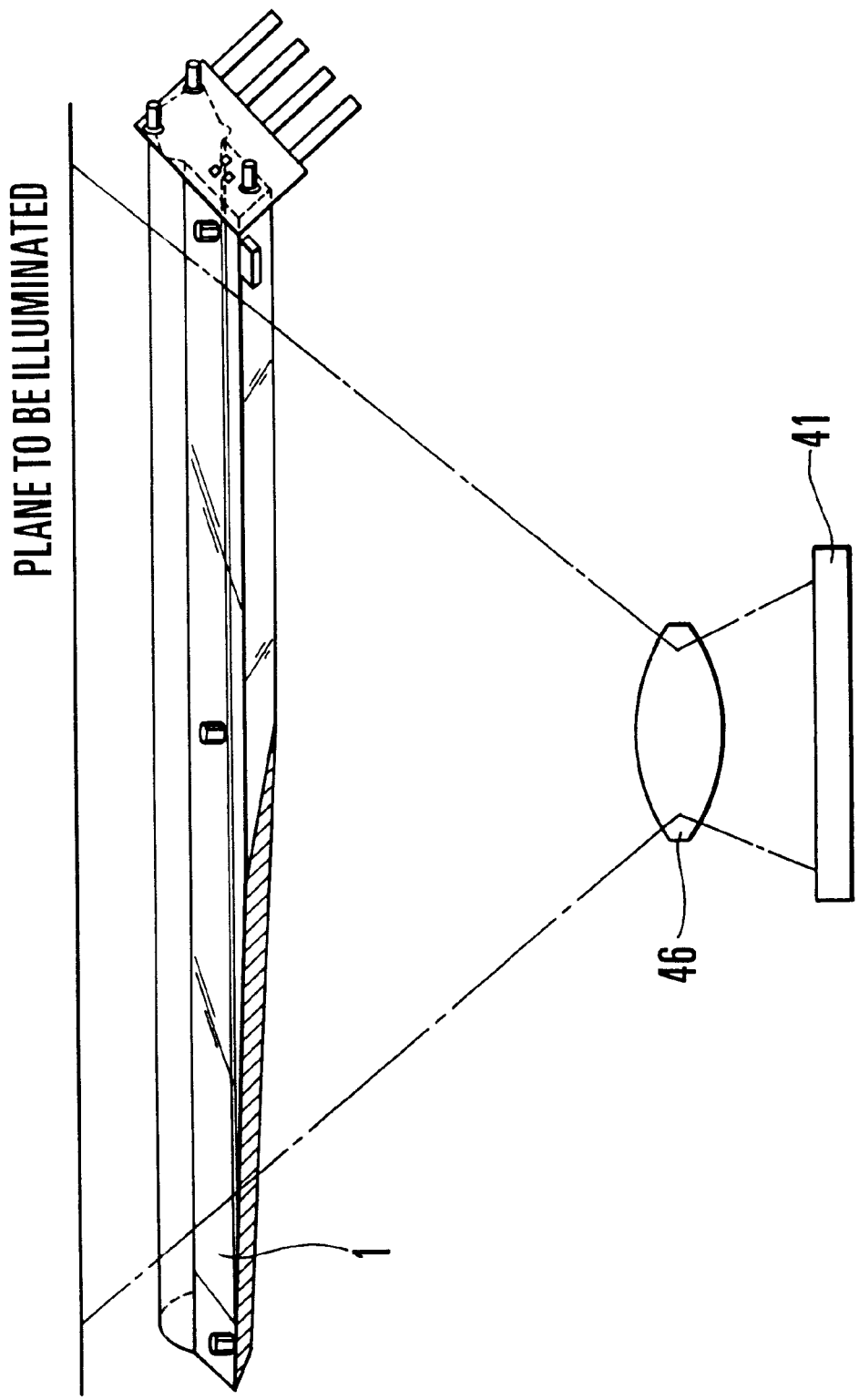
FIG. 43 is a schematic diagram of another example of arrangement of the photo-electric transducer device in the information processing apparatus shown in FIG. 40.
Figure 44:
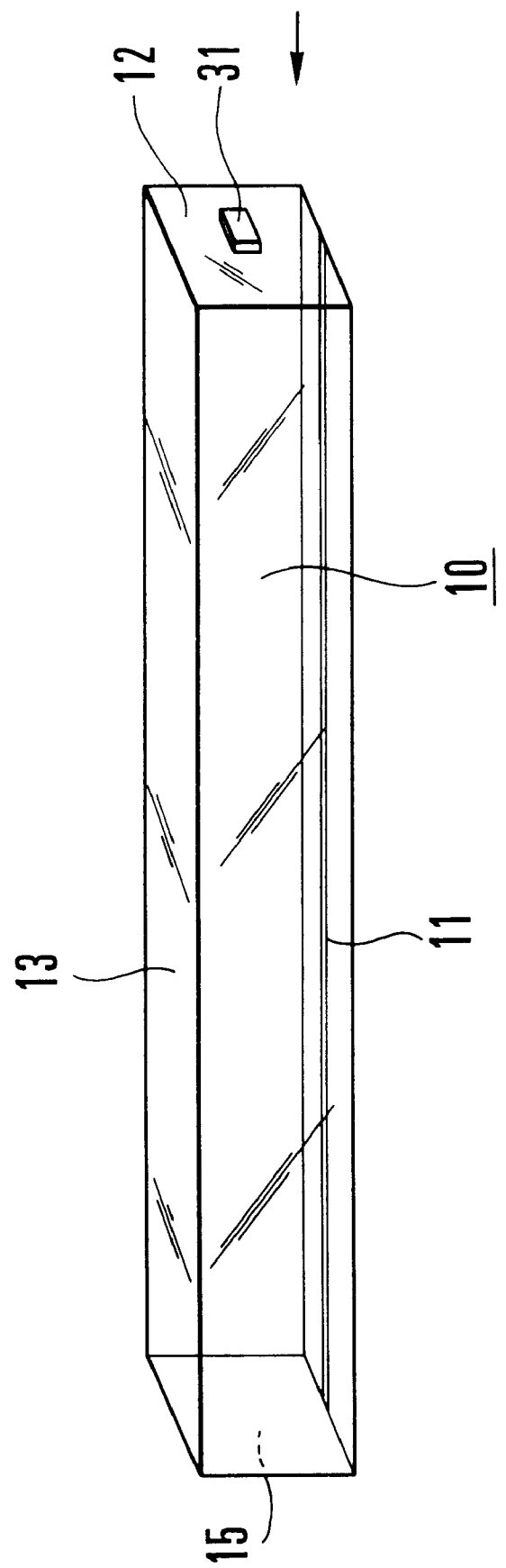
FIG. 44 is a perspective view of an illumination device according to the related art.

FIGS. 41 and 42 are a sectional view and a top schematic view in enlarged scale of the photo-electric transducer device 100 in the information processing apparatus shown in FIG. 40.

The photo-electric transducer device 100 is constructed from a great number of photo-electric transducer elements 41 arrayed in a common line with high accuracy on a base plate 42 of glass-epoxy material, the length of the sensor array 41 corresponding to the format of sheet for manuscript, a lens array 43, an illumination device 1, a cover plate 44 of transparent glass also serving as a support for the manuscript, and a frame 45 made of metal such as aluminum or resin material such as polycarbonate, for positioning and holding the above parts.

The illumination device 1 is set up in the frame 45 as follows. The frame 45 is previously provided with a locating hole. The illumination device 1, while keeping its locator pin 17 in alignment with the locating hole, is first inserted into the frame 45 and seated therein.

Then, to cure the warp of the illumination device 1, the cover glass 44 presses a pin 18, as it is put in the opening of the frame 45 and adhered thereto.

Accordingly, the illumination device 1 can be fixedly mounted at the accurate location without any warp. So, the illumination device 1 can cast light accurately on the desired position to be illuminated.

In the apparatus described above, as the manuscript is supported in pressed relation against the cover glass 44, the illumination device 1 projects three color light fluxes R, G and B in sequence to the manuscript obliquely or at an angle of about 45°. The reflected color light fluxes R, G and B are focused by the lens array 42 to the photo-electric transducer element 41 where the three color items of light information are converted into electrical signals. The electrical signals are transferred to the system where they are processed and applied to the recording device. A color image is thus reproduced.

The photo-electric transducer device is not necessarily of the form described above using the lens of unity magnification. It may be of another form using the illumination device of the invention such as that shown in FIG. 43. This example employs a contraction type lens 46. So, the manuscript being lighted up by the illumination device is projected in a reduced size to the photo-electric transducer element 41 such as a CCD array. The illumination device of the invention is applicable to such an apparatus.

Also, for such a type of apparatus, in the general case, on consideration of the optical characteristics of the contraction lens, a distribution of high illuminance at both marginal zones and low illuminance in the central zone is rather desirable than the uniform one.

Even in this case, according to the invention, an advantage is produced that the illuminance at that end which carries the light source is prevented from rising too much high, because the light is guided efficiently to the opposite end.

Another advantage is produced in preventing the illuminance at both ends of the light guide segments from rising too much high.

It will be appreciated from the foregoing that the illumination device comprises the light guide element 10 whose substrate is light transmissive and which has an entrance surface 12 for light at one of the ends thereof, the diffusion area 11 formed in one of the longitudinal side surfaces to reflect and/or scatter the arriving light and the exit surface 13 from which the reflected and/or scattered light emerges in a direction to illuminate, and the light source having a light-emitting element positioned adjacent the entrance surface 12, wherein the light guide segment is narrowed in part so that the light from the light-emitting element, after having entered from the entrance surface 12, is prevented from directly reaching the diffusion area 11, that is, the proportion of the direct light to the diffusion area 11 is decreased. The light can propagate to a much remoter distance, thus improving the longitudinal unevenness of illuminance that the illuminance is high near the light source and becomes progressively lower as the distance increases.

Also, by changing the shape of the narrowed portion along the longitudinal direction of the light guide element 10, the amount of light going to the outlet segment can be freely adjusted. Therefore, the illumination distribution can be even more uniform.

Further, with the aim to condense the light, the exit surface 13 is used to obtain the refracting power. Since, in this case, the guide segment and the outlet segment are optically independent of each other, the lens portion does not participate in guiding the light. Therefore, change of the lens shape does not cause change of the longitudinal illuminance distribution. So, it becomes possible to condense the light beam to a desired width by changing the lens shape.

As the information processing apparatus, besides the facsimile telegraph described above, mention may be made of the image scanner that has no recording head for printing out the image but sends the information of the read image to the computer or network.

As has been described above, according to the invention, it is possible to provide an illumination device which is reduced in size, while still permitting illumination to be performed with uniformity at a high intensity, and which is amenable to the low cost production.

According to the invention, it is also possible to provide an illumination device of wide versatility, since a desired width of light condensation can be set up while keeping the uniform illuminance.

According to the invention, it is also possible to provide an illumination device which is easy to set up in location and to cure the warp.

In addition, according to the invention, it is possible to provide a photo-electric transducer device capable of reading the image with high accuracy and reliability and an information processing apparatus using the same.

What is claimed is:

1. An illumination device comprising:
   a light source; and
   longitudinal light-transmissive light guide having an entrance surface at which light from said light source enters said longitudinal light guide, a longitudinal diffusion area which diffuses the light coming from said entrance surface along a longitudinal direction of said longitudinal light guide, and an exit surface at which the diffused light exits in a predetermined direction,
   wherein said longitudinal light guide is formed such that the entering light coming from said entrance surface of said longitudinal light guide is not made incident directly on at least a part of said longitudinal diffusion area of said longitudinal light guide and a center of said light source is positioned farther from said exit surface than a plane which is formed by at least a part of said diffusion area, when viewed in the longitudinal direction.

2. An illumination device according to claim 1, wherein said longitudinal light guide has opposed side ends and wherein said light source is positioned on one of said side ends of said light guide.

3. An illumination device according to claim 1, wherein said longitudinal light guide has opposed side ends and wherein said light source is positioned on one of said side ends of said light guide, and further comprising means for returning light provided on the other side end of said light guide.

4. An illumination device according to claim 3, wherein said means for returning light includes a light reflection coating applied to said other side end of said light guide.

5. An illumination device according to claim 3, wherein said means for returning light includes a roughened surface formed on the opposite side end of said light guide.

6. An illumination device according to claim 1, wherein at least a part of said light guide is covered by a housing made of a light reflection member.

7. An illumination device according to claim 6, wherein said housing also serves as means for returning light at one of side ends of said light guide.

8. An illumination device according to claim 1, further comprising a light condensing portion provided at said exit surface.

9. An illumination device according to claim 1, further comprising means for positioning said light guide in a longitudinal direction thereof.

10. An illumination device according to claim 1, further comprising means for curing any warp of said light guide.

11. An illumination device according to claim 1, wherein said diffusion area has a reflection surface of saw-teeth form.

12. An illumination device according to claim 1, wherein said diffusion area is formed by a light reflection coating.

13. An illumination device according to claim 1, wherein said entrance surface is provided with a projected portion arranged to be fitted in said light source.

14. An illumination device according to claim 1, wherein said light source is an LED (light emitting element).

15. An illumination device according to claim 1, wherein said light source is composed of a plurality of LEDs for emitting light fluxes of different wavelengths.

16. An illumination device according to claim 1, wherein said light source is composed of a plurality of LEDs for emitting three light fluxes of different wavelengths corresponding to blue, green and red, respectively.

17. An information processing apparatus equipped with an illumination device, said illumination device comprising:
    a light source; and
    a longitudinal light-transmissive light guide having an entrance surface at which light from said light source enters said longitudinal light guide, a longitudinal diffusion area which diffuses the light coming from said entrance surface along a longitudinal direction of said longitudinal light guide, and an exit surface at which the diffused light exits in a predetermined direction,
    wherein said longitudinal light guide is formed such that the entering light coming from said entrance surface of said longitudinal light guide is not made incident directly on at least part of said longitudinal diffusion area of said longitudinal light guide and a center of said light source is positioned farther from said exit surface than a plane which is formed by at least a part of said diffusion area, when viewed in the longitudinal direction.

18. An information processing apparatus according to claim 17, wherein, in said illumination device, said longitudinal light guide has opposed side ends and said light source is positioned on one of said side ends of said light guide.

19. An information processing apparatus according to claim 17, wherein, in said illumination device, said longitudinal light guide has opposed side ends and said light source is positioned on one of said side ends of said light guide, and further comprising means for returning light provided on the other side end of said light guide.

20. An information processing apparatus according to claim 19, wherein, in said illumination device, said means for returning light includes a light reflection coating applied to said other side end of said light guide.

21. An information processing apparatus according to claim 19, wherein, in said illumination device, said means for returning light includes a roughened surface formed on the opposite side end of said light guide.

22. An information processing apparatus according to claim 17, wherein, in said illumination device, at least a part of said light guide is covered by a housing made of a light reflection member.

23. An information processing apparatus according to claim 22, wherein, in said illumination device, said housing also serves as means for returning light at one of side ends of said light guide.

24. An information processing apparatus according to claim 17, wherein said illumination device further comprises a light condensing portion provided at said exit surface.

25. An information processing apparatus according to claim 17, wherein said illumination device further comprises means for positioning said light guide in a longitudinal direction thereof.

26. An information processing apparatus according to claim 17, wherein said illumination device further comprises means for curing any warp of said light guide.

27. An information processing apparatus according to claim 17, wherein said diffusion area in said illumination device has a reflection surface of saw-teeth form.

28. An information processing apparatus according to claim 17, wherein said diffusion area in said illumination device is formed by a light reflection coating.

29. An information processing apparatus according to claim 17, wherein said entrance surface in said illumination device is provided with a projected portion arranged to be fitted in said light source.

30. An information processing apparatus according to claim 17, wherein said light source of said illumination device is an LED (light emitting element).

31. An information processing apparatus according to claim 17, wherein said light source of said illumination device is composed of a plurality of LEDs for emitting light fluxes of different wavelengths.

32. An information processing apparatus according to claim 17, wherein said light source of said illumination device is composed of a plurality of LEDs for emitting three light fluxes of different wavelengths corresponding to blue, green and red, respectively.

33. An illumination device further comprising:
    a light source; and
    a longitudinal light-transmissive light guide having an entrance surface at which light from said light source enters said longitudinal light guide, a longitudinal diffusion area which diffuses the light coming from said entrance surface along a longitudinal direction of said longitudinal light guide, and an exit surface at which the diffused light exits in a predetermined direction;
    partition means for blocking light between said light source and said diffusion area so that the entering light coming from said entrance surface of said longitudinal light guide is not made incident directly on at least a part of said longitudinal diffusion area of said longitudinal light guide.

34. An illumination device according to claim 33, wherein said longitudinal light guide has opposed side ends and wherein said light source is positioned on one of said side ends of said light guide.

35. An illumination device according to claim 33, wherein said longitudinal light guide has opposed side ends and wherein said light source is positioned on one of said side ends of said light guide, and further comprising means for returning light provided on the other side end of said light guide.

36. An illumination guide according to claim 35, wherein said means for returning light includes a light reflection coating applied to said other side end of said light guide.

37. An illumination device according to claim 35, wherein said means for returning light includes a roughened surface formed on the opposite side end of said light guide.

38. An illumination device according to claim 33, wherein at least a part of said light guide is covered by a housing made of a light reflection member.

39. An illumination device according to claim 38, wherein said housing also serves as means for returning light at one of side ends of said light guide.

40. An illumination device according to claim 33, further comprising a light condensing portion provided at said exit surface.

41. An illumination device according to claim 33, further comprising means for positioning said light guide in a longitudinal direction thereof.

42. An illumination device according to claim 33, further comprising means for curing any warp of said light guide.

43. An illumination device according to claim 33, wherein said diffusion area has a reflection surface of saw-teeth form.

44. An illumination device according to claim 33, wherein said diffusion area is formed by a light reflection coating.

45. An illumination device according to claim 33, wherein said entrance surface is provided with a projected portion arranged to be fitted in said light source.

46. An illumination device according to claim 33, wherein said light source is an LED (light emitting element).

47. An illumination device according to claim 33, wherein said light source is composed of a plurality of LEDs for emitting light fluxes of different wavelengths.

48. An illumination device according to claim 33, wherein said light source is composed of a plurality of LEDs for emitting three light fluxes of different wavelengths corresponding to blue, green and red, respectively.

49. An information processing apparatus equipped with an illumination device, said illumination device comprising:
 a light source; and
 a longitudinal light-transmissive light guide having an entrance surface at which light from said light source enters said longitudinal light guide, a longitudinal diffusion area which diffuses the light coming from said entrance surface along a longitudinal direction of said longitudinal light guide, and an exit surface at which the diffused light exits in a predetermined direction,
 partition means for blocking light between said light source and said diffusion area so that the entering light coming from said entrance surface of said longitudinal light guide is not made incident directly on at least part of said longitudinal diffusion area of said longitudinal light guide.

50. An information processing apparatus according to claim 49, wherein in said illumination device, said longitudinal light guide has opposed side ends and said light source is positioned on one of said side ends of said light guide.

51. An information processing apparatus according to claim 49, wherein, in said illumination device, said longitudinal light guide has opposed side ends and said light source is positioned on one of said side ends of said light guide, and further comprising means for returning light provided on the other side end of said light guide.

52. An information processing apparatus according to claim 51, wherein, in said illumination device, said means for returning light includes a light reflection coating applied to said other side end of said light guide.

53. An information processing apparatus according to claim 51, wherein, in said illumination device, said means for returning light includes a roughened surface formed on the opposite side end of said light guide.

54. An information processing apparatus according to claim 49, wherein, in said illumination device, at least a part of said light guide is covered by a housing made of a light reflection member.

55. An information processing apparatus according to claim 54, wherein, in said illumination device, said housing also serves as means for returning light at one of side ends of said light guide.

56. An information processing apparatus according to claim 49, wherein said illumination device further comprises a light condensing portion provided at said exit surface.

57. An information processing apparatus according to claim 49, wherein said illumination device further comprises means for positioning said light guide in a longitudinal direction thereof.

58. An information processing apparatus according to claim 49, wherein said illumination device further comprises means for curing any warp of said light guide.

59. An information processing apparatus according to claim 49, wherein said diffusion area in said illumination device has a reflection surface of saw-teeth form.

60. An information processing apparatus according to claim 49, wherein said diffusion area in said illumination device is formed by a light reflection coating.

61. An information processing apparatus according to clam 49, wherein said entrance surface in said illumination device is provided with a projected portion arranged to be fitted in said light source.

62. An information processing apparatus according to claim 49, wherein said light source of said illumination device is an LED (light emitting element).

63. An information processing apparatus according to claim 49, wherein said light source of said illumination device is composed of a plurality of LEDs for emitting light fluxes of different wavelengths.

64. An information processing apparatus according to claim 49, wherein said light source of said illumination device is composed of a plurality of LEDs for emitting three light fluxes of different wavelengths corresponding to blue, green and red, respectively.

65. An information processing apparatus according to claim 17, further comprising a photoelectric conversion device for reading an original illuminated by said illumination device and a driving unit for shifting a positional relationship between the original and said photoelectric conversion device.

66. An information processing apparatus according to claim 49, further comprising a photoelectric conversion device for reading an original illuminated by said illumination device and a driving unit for shifting a positional relationship between the original and said photoelectric conversion device.

* * * * *

UNITED STATES PATENT AND TRADEMARK OFFICE
CERTIFICATE OF CORRECTION

PATENT NO. : 6,375,335 B1
DATED : April 23, 2002
INVENTOR(S) : Masami Tabata et al.

It is certified that error appears in the above-identified patent and that said Letters Patent is hereby corrected as shown below:

Title page,
Item [30], (both occurrences) delete "December 19, 1996" and insert
-- December 27, 1996 --.

Column 15,
Line 64, delete "be put there" and insert -- be diposed there --.

Signed and Sealed this

Fourteenth Day of January, 2003

JAMES E. ROGAN
*Director of the United States Patent and Trademark Office*